US012334628B2

(12) United States Patent
Hojjat

(10) Patent No.: US 12,334,628 B2
(45) Date of Patent: Jun. 17, 2025

(54) NARROW MIMO SIDE-BY-SIDE ARRAYS USING COMPLIMENTARY ARRAY ARRANGEMENT

(71) Applicant: Communication Components Antenna Inc., Kanata (CA)

(72) Inventor: Nasrin Hojjat, Ottawa (CA)

(73) Assignee: Communication Components Antenna Inc., Kanata (CA)

( * ) Notice: Subject to any disclaimer, the term of this patent is extended or adjusted under 35 U.S.C. 154(b) by 211 days.

(21) Appl. No.: 18/121,588

(22) Filed: Mar. 15, 2023

(65) Prior Publication Data

US 2023/0291128 A1 Sep. 14, 2023

Related U.S. Application Data

(63) Continuation-in-part of application No. 17/236,964, filed on Apr. 21, 2021, now Pat. No. 12,027,758.

(51) Int. Cl.

| | |
|---|---|
| ***H01Q 1/24*** | (2006.01) |
| ***H01Q 5/42*** | (2015.01) |
| ***H01Q 21/06*** | (2006.01) |
| ***H01Q 21/28*** | (2006.01) |
| *H01Q 3/26* | (2006.01) |

(52) U.S. Cl.

CPC ............... *H01Q 1/246* (2013.01); *H01Q 5/42* (2015.01); *H01Q 21/062* (2013.01); *H01Q 21/065* (2013.01); *H01Q 21/28* (2013.01); *H01Q 3/26* (2013.01)

(58) Field of Classification Search

CPC .......... H01Q 1/246; H01Q 1/523; H01Q 3/26; H01Q 5/42; H01Q 21/22; H01Q 21/28; H01Q 21/062; H01Q 21/065; H01Q 25/00

See application file for complete search history.

(56) References Cited

U.S. PATENT DOCUMENTS 12,027,758 B2 * 7/2024 Hojjat .................... H01Q 1/246
2009/0224995 A1 * 9/2009 Puente ..................... H01Q 1/42 343/893
2023/0299469 A1 * 9/2023 Kasani ............... H01Q 21/0025 343/835
2024/0162599 A1 * 5/2024 Bunga .................... H01Q 21/08

* cited by examiner

*Primary Examiner* — Robert Karacsony
(74) *Attorney, Agent, or Firm* — Sofer & Haroun, LLP

(57) ABSTRACT

A cellular antenna includes at least a first array of elements arranged in horizontal rows and vertical columns and at least a second array of elements arranged in horizontal rows and vertical columns. The first group and the second arrays are arranged at least partially side-by side on the antenna, The elements of the first array are arranged in at least one vertical column of elements that is exclusive to elements of the first array. The elements of the second array are arranged in at least one vertical column of elements that is exclusive to elements of the second array. The antenna includes at least one separate middle vertical column of elements, between the at least one vertical column of elements that is exclusive to elements of the first array and the at least one vertical column of elements that is exclusive to elements of the second array, where the middle vertical column of elements includes some elements in the first array and some elements in the second array.

11 Claims, 27 Drawing Sheets

10 rows 33, 44, 44, 44, 44

Antenna 54 from Fig. 6

10 rows 33, 44, 33, 44, 33

Antenna 18 from Fig. 7

(PRIOR ART)

two stacked 8 rows 44, 44, 44, 44

(PRIOR ART)

10 rows 44, 44, 44, 44

NARROW MIMO SIDE-BY-SIDE ARRAYS USING COMPLIMENTARY ARRAY ARRANGEMENT

RELATED APPLICATION

This application is a continuation-in-part application from Ser. No. 17/236,964, filed on Apr. 21, 2021 which in turn claims the benefit of priority from U.S. Provisional Patent Application No. 63/074,332, filed on Sep. 3, 2020, the entirety of which are incorporated by reference.

FIELD OF THE INVENTION

This invention relates to antennas. More particularly, the present invention relates to an antenna element and array arrangement for cellular antennas.

PRIOR ART

In the field of cellular antennas, FIG. 1 illustrates a prior art side by side 20 port hybrid BSA (Bi-Sector Array) with one (4×4) low band MIMO (Multiple-In Multiple-Out) arrangement and two (4×4) or one (8×8) mid band arrangement MIMOs per bisector beam.

FIG. 1 illustrates an exemplary prior art arrangement where ports 1 and 2 are feeding low band antenna elements A (ten dipoles) through a combined network of beamformer circuits and ports 3 and 4 are feeding low band antenna elements B (ten dipoles) through a variety of beamformer circuits. These elements A and B represent an exemplary a (4×4) low band arrangement. Moving to the mid band elements, ports 5 and 6 as well as ports 13 and 14 are feeding mid band antenna elements C (40 patches); ports 7 and 8 as well as ports 15 and 16 are feeding mid band elements D (40 patches); ports 9 and 10 as well as ports 17 and 18 are feeding mid band elements E (40 patches); and ports 11 and 12 as well as ports 19 and 20 are feeding mid band elements F (40 patches). These elements C-F represent the two (8×8) mid band MIMO arrangements.

To this end, the architecture of FIG. 1 illustrates for the four mid band arrangements, 4 bi-sector independent antenna arrays of forty patch elements each, as shown by elements C-F and in total have eight vertical columns of mid-band elements. The low band arrangements on the same antenna are in two staggered vertical columns of low-band dipoles A and B. This architecture is based for example on U.S. Patent Publication No. 2018/0301801A1, incorporated by reference, with the low-band elements A and B being dipoles antennas and mid-band elements C-F being patch antennas. The total width of a panel incorporating such an antenna is >600 mm, due to the eight column architecture of the mid band elements of the antenna.

However, considering the new trend for 4G/5G communication, there is an ever increasing need to place many base station antennas adjacent each other in towers utilizing smaller antenna dimensions, particularly with narrower widths. One option for decreasing the width of the antenna is to eliminate one column and employ only three columns of mid band arrays instead of four, but this approach considerably reduces the performance of the antenna for azimuth sidelobe and gain characteristics.

Another version of a similar prior art architecture uses a mix of three and four columns of low band dipole elements as shown in FIG. 2 (taken from U.S. Patent Application No. 2018/0301801 and described in the related sections on paragraphs [0052-0053] and incorporated herein by reference.). However, the mid band patch elements still occupy eight physical columns across the width and thus the antenna width is greater than 600 mm as with the prior art arrangement of FIG. 1.

SUMMARY OF INVENTION

The present arrangement looks to decrease the width of the antenna by making it significantly less than 600 mm wide without compromising azimuth sidelobe and gain performance. In one embodiment, in the present arrangement, to narrow the width of the antenna without noticeably compromising the performance, a new architecture is provided with entangled arrays. In this architecture alternate rows (or a pair of rows) of mid-band array have a different number of columns. The number of columns for left and right arrays are assigned in a complementary format so in total the width of array would be seven vertical columns instead of eight columns. The following is a brief summary of the interweaved array architecture. Further details and explanations, including the array numbers can be found in the subsequent Drawings and Detailed Description sections of this application.

In one embodiment, an antenna architecture is provided for a twenty port hybrid BSA (Bi-Sector-Array) with one (4×4) low band MIMO and one (8×8) or two (4×4) mid band MIMOs per bisector beam. The mid-band is 33 deg Azimuth beamwidth at 1695-2690 MHz and the low band is 65 deg Azimuth beamwidth at 698-960 MHz. The mid band arrays are arranged with at least two side by side arrays in which the two arrays at both the top and bottom of the antenna are entangled together in a complementary format in terms of number of columns. This reduces the number of vertical columns in side by side architecture by one column which reduce the width of antenna compared to prior art. For example, the width of this antenna may be about 500 mm wide instead of more than 600 mm as in the prior art of FIGS. 1 and 2.

In this arrangement, the antenna architecture is two stacks of side-by-side bisector arrays of mid band elements, and two columns of low band elements to make a twenty port antenna array. The antenna architecture is two side by side bisector arrays with the arrangement of patches being 3,3, 4,4, 3,3 . . . for the top left side array and 4,4, 3,3, 4,4 . . . for the top right side array. This is explained in more detail below for example with FIG. 3A, but for brevity, this means that for the array starting at the top left of the antenna, horizontal rows one and two of the elements have three patch elements (the top of vertical columns one through three) and the array on the top right has four patch elements in horizontal rows one and two (the top of vertical columns four through seven). For horizontal rows three and four the pattern reverses, and the top left array has four patch elements and the top right array has three patch elements, the pattern continuing down the vertical length of the antenna.

An exemplary embodiment of the invention using this pattern can be an antenna with an eight-row array, on the top left of the antenna 3,3, 4,4, 3,3, 4,4, and for the top right array, 4,4, 3,3, 4,4, 3,3 but spanning only seven vertical columns total instead of eight. The numbering of columns is explained in more detail below in the detailed description. See for example the description of FIG. 3A.

In another embodiment, using the same concept for the pattern designation, the antenna architecture is a two side by side array with bisector arrays, with the number of columns being 3,4, 3,4, 3,4 . . . and 4,3, 4,3, 4,3 . . . . An exemplary antenna as such can be an eight-row array, on the top right with antenna element placement pattern of 3,4, 3,4, 3,4, 3,4, and for the top left array having an antenna element placement pattern of 4,3, 4,3, 4,3, 4,3, again with seven vertical columns total as shown for example in FIG. 3B and described in more detail below.

It is understood that similar architecture patterns can be use in other sized antennas that have two side by side arrays. For example, in another embodiment, the antenna architecture—with a total of 5 vertical columns can be implemented for a 33 deg antenna which would usually be 6 columns wide with the number of columns (in the five column arrangement) being 2,2, 3,3, 2,2 . . . and 3,3, 2,2, 3,3 . . . . An exemplary antenna as such can be a ten row array on the left of the antenna with antenna element placement pattern of 2,2, 3,3, 2,2, 3,3, 2,2 and for the right array having antenna element placement pattern of 3,3, 2,2, 3,3, 2,2, 3,3 with five total vertical columns. This reduces the width of the array from about 300 mm to about 240 mm for an array implemented in high-band frequencies 3100-4200 MHz.

In another embodiment, an antenna architecture with two bisector arrays is partially side by side and, only in the common area, with the number of columns being reduced by one, using a complementary number of columns. The antenna architecture can have two partially side by side arrays that have columns of 4,4, 4,4, 4,4, 4,4, 4,4, 3,3 and 3,3, 4,4, 4,4, 4,4, 4,4 in a twelve port array architecture also described in more detail below. In this implementation, the antenna width was reduced from 570 mm to 496 mm, and also the high band gain increased by about 0.8 dB due to different architecture and addition of two entangled rows.

In another embodiment, the present arrangement may be used to provide improved 4×4 MIMO antenna (65 degree or 45 degree). For example, prior art arrangements for a 4×4 MIMO 65 degree antenna is usually formed using two staggered columns of elements as shown for example in FIG. 11 (prior art). However, because the two columns are staggered to control the azimuth bandwidth to 65 degrees, there is a limited number of elements per column (e.g. eight elements per column in FIG. 11) so there is limitations on the gain from this antenna. Regarding, a 4×4 MIMO 45 degree antenna, these are typically made using four columns of antennas to achieve the designed azimuth 45 degrees. See for example prior art FIG. 12. Here each array (left and right) has ten (10) elements in two columns of five (5) so the antenna gain is adequate, but the foot print is excessively wide.

The present arrangement provides an improved 4×4 MIMO antenna, in either 65 degrees or 45 degrees, where three columns of element are used, with a left array having one left column of elements and the right array using one right column of elements, and a central column of elements where elements of this column are shared with both the left and right arrays. By properly setting the distance between columns and adjusting the splitting of power between the antenna elements, a 4×4 MIMO antenna can be achieved with a greater gain than the prior art and with a lesser (width) footprint.

BRIEF DESCRIPTION OF THE DRAWINGS

The present invention can be best understood through the following description and accompanying drawing, wherein.

DETAILED DESCRIPTION

Figure 3A:
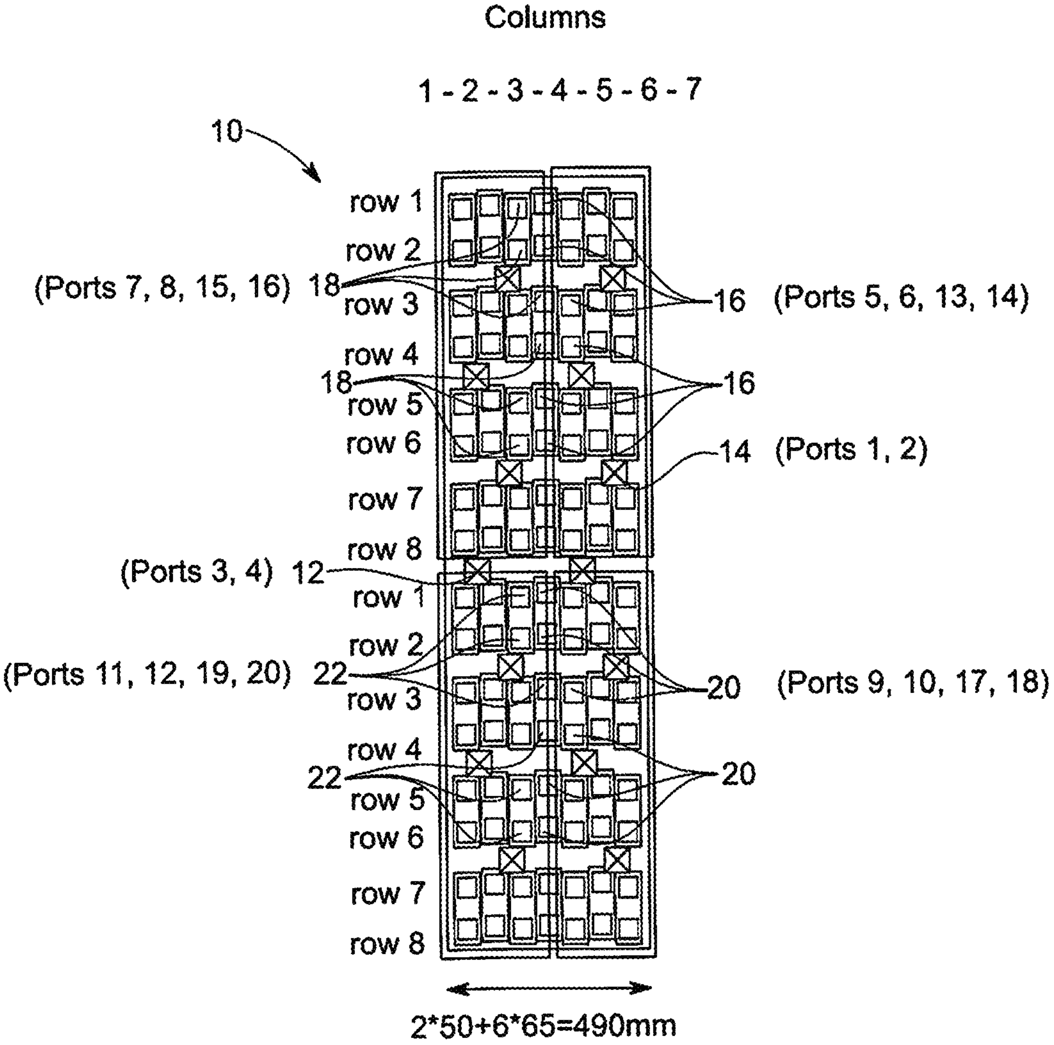
FIGS. 3A and 3B illustrate two different antenna architectures for a side by side bisector arrays with entangled interconnected mid band arrays with seven columns and a common center point line, in accordance with one embodiment.

In one embodiment of the present invention as shown in FIG. 3A a 20 ports hybrid BSA (Bi-Sector Array) 10 is shown with one 4×4 MIMO arrangement and two (4×4) or one 8×8 MIMO arrangements, per bisector beam the mid band operating at 1695-2690 MHz (two 8×8 MIMOs) and the low band being at 65 deg and operating at 698-960 MHz (one 4×4 MIMO).

In this example, a first vertical column 12 of low band dipole elements is arranged on one side of antenna 10 and another second vertical column 14 of low band dipole elements is arranged on the other side of antenna 10. Low band elements 12 can be connected to ports one and two of the twenty ports and low band elements 14 can be connected to ports three and four of the twenty ports forming the 4×4 MIMO at the low-band (698-960 MHz).

On antenna 10 there are four arrays of mid-band elements totaling twenty eight elements in each array. A first set of mid band elements 16 can be connected to ports five, six, thirteen and fourteen of the twenty ports. A second set of mid band elements 18 can be connected to ports seven, eight, fifteen and sixteen of the twenty ports. A third set of mid band elements 20 can be connected to ports nine, ten, seventeen and eighteen of the twenty ports. A fourth set of mid band elements 22 can be connected to ports eleven, twelve, and nineteen and twenty of the twenty ports. Together this set of elements 16, 18, 20 and 22 form the two 8×8 MIMO (Multiple-Input Multiple-Output) for the mid-band (1695-2690 MHz) the first 8×8 MIMO is on the left beam and the second 8×8 MIMO is on the right beam. Each set of twenty-eight elements (16, 18, 20, and 22) produce both a right and left beam.

As shown in FIG. 3A, the four sets of mid band elements 16, 18, 20, and 22 are arranged with elements 16 and 18 in two side by side arrays at the top of antenna 10 and elements 20 and 22 are arranged side by side at the bottom of antenna 10. At the top of antenna 10 the array of elements 16 and 18 are arranged in eight horizontal rows (top rows one through eight) and at the bottom of the antenna elements 20 and 22 are arranged in eight additional horizontal rows (bottom rows one through eight).

For both the top arrays of elements 16 and 18 and the bottom arrays of elements 20 and 22, there are only seven total vertical columns (columns one through seven).

Across the top row of antenna 10, there are three elements 18 and four elements 16. The same is true of row two. For rows three and four it is reversed and there are four elements 18 and three elements 16. In each case there are seven total elements across each row one in each of columns one through seven. The pattern repeats again for rows five through eight at the top half of antenna 10 for the arrays of elements 16 and 18.

This means that looking at the arrays of elements 18 and 16 at the top half of antenna 10 on a column basis, elements 18 form three columns (e.g. columns one, two, and three) in rows one and two, four columns (e.g. columns one, two, three, and four) in rows three and four, three columns in rows five and six, and four columns in rows seven and eight. Thus, the mid band MIMO array of elements 18 can be annotated with a 3,3, 4,4, 3,3, 4,4 pattern designating the number of elements 18 in each of rows one through eight on the top left of antenna 10. The mid band MIMO array of elements 16 can related be annotated 4,4, 3,3, 4,4, 3,3 pattern designating the number of elements 18 in each of rows one through eight on the top left of antenna 10. As shown in FIG. 3A, this pattern is again repeated for the arrays of elements 22, and 20 respectively at the bottom half of antenna 10. Based on this arrangement elements 18 are the only elements in columns one, two, and three and elements 16 are the only elements in columns five, six, and seven.

However, as can be seen in FIG. 3A the centerline column four has elements 16 and 18 from both arrays. For example, in rows one and two, column four has elements 16 from the top right array, but in rows three and four, column four has elements 18 from the top left array. This pattern repeats down the center column four. This is where the top left and top right arrays "interlock" with one another as shown in FIG. 3A.

Figure 3B:
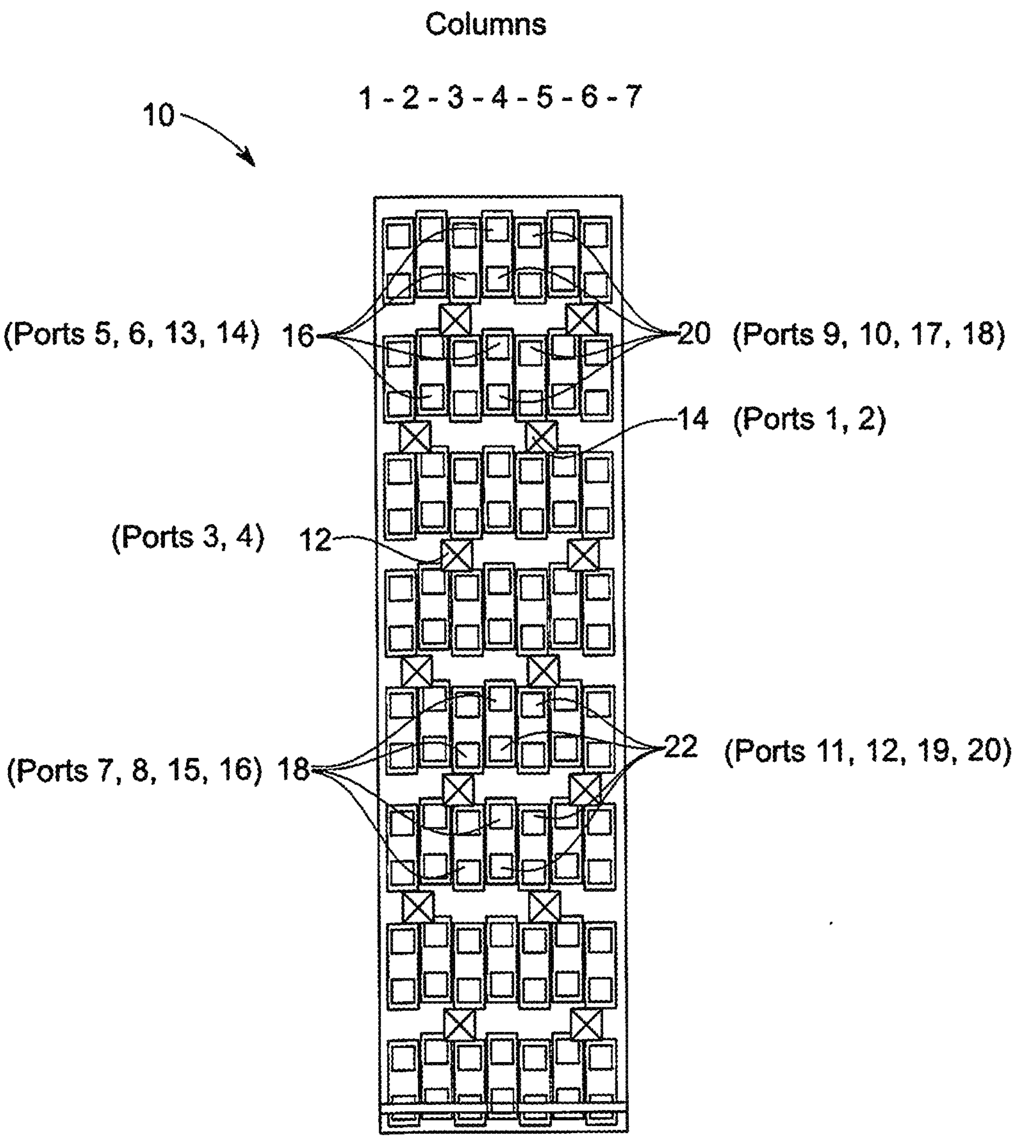

In another related embodiment, shown in FIG. 3B, across the first row of antenna 10, there are four elements 16 and three elements 20. The reverse is true of row two which has three elements 16 and four elements 20. In each case seven total elements across each row forming the top of columns one through seven. The pattern repeats again for rows three through eight at the top of antenna 10 for the arrays of elements 16 and 20. The same pattern holds for array elements 18 and elements 22 at the bottom of antenna 10.

Essentially, FIG. 3B is similar to FIG. 3A except that in the center column four, moving vertically down antenna 10 has one element 16 then one element 20, with the pattern continuing. This means instead of alternating every two rows, column four alternates every other row.

This means that looking at the arrays of elements 16 and 20 at the top half of antenna 10 on a column basis, there are four elements 16 in row one and three elements 20, starting the top half of the seven vertical columns. This is reversed in row two with only three elements 16 and four elements 20 forming the next row of the seven columns. The pattern is repeated for rows three through eight at the top of antenna 10. Thus, the mid band MIMO array of elements 16 can be annotated as 4,3, 4,3, 4,3, 4,3 pattern. The mid band MIMO array of elements 20 can be annotated as 3,4, 3,4, 3,4, 3,4. Pattern. As shown in FIG. 3B, this pattern is again repeated for the arrays of elements 18, and 22 respectively at the bottom of antenna 10.

As seen in FIG. 3B the centerline column four has elements from elements 16 and elements 20. For example, in row one, column four has elements 16 from the top left array, but in row two, column four has elements 20 from the top right array. This pattern repeats down the center column four. This is where the top left and top right arrays "interlock" with one another as shown in FIG. 3B. Compared to architecture in FIG. 3A, architecture in FIG. 3B may be used to provide an improved elevation pattern but has slightly more complex feed structure for the middle column that can be addressed using two element subarrays, feeding each element independently. The improved elevation pattern in the embodiment of FIG. 3B compared to FIG. 3A is due to less vertical space between the elements in column four for each of the left and right arrays. For example, as can be seen in FIG. 3A the maximum vertical spacing is three rows between any two elements 16, while in FIG. 3B the maximum vertical spacing is two rows between any two elements 16 (the same is two for any of elements 16, 18, 20, and 22 in column 4).

The element arrangements in FIG. 3B of 16, 18, 20 and 22 can be assigned different port assignments in this embodiment, but it is noted that any effective port assignment that generates an 8×8 MIMO antenna may be used. It is noted that port assignment is based on the desired beams so the customer may implement such embodiment as two 4*4 MIMOs as an alternative port implementation.

Figure 1:
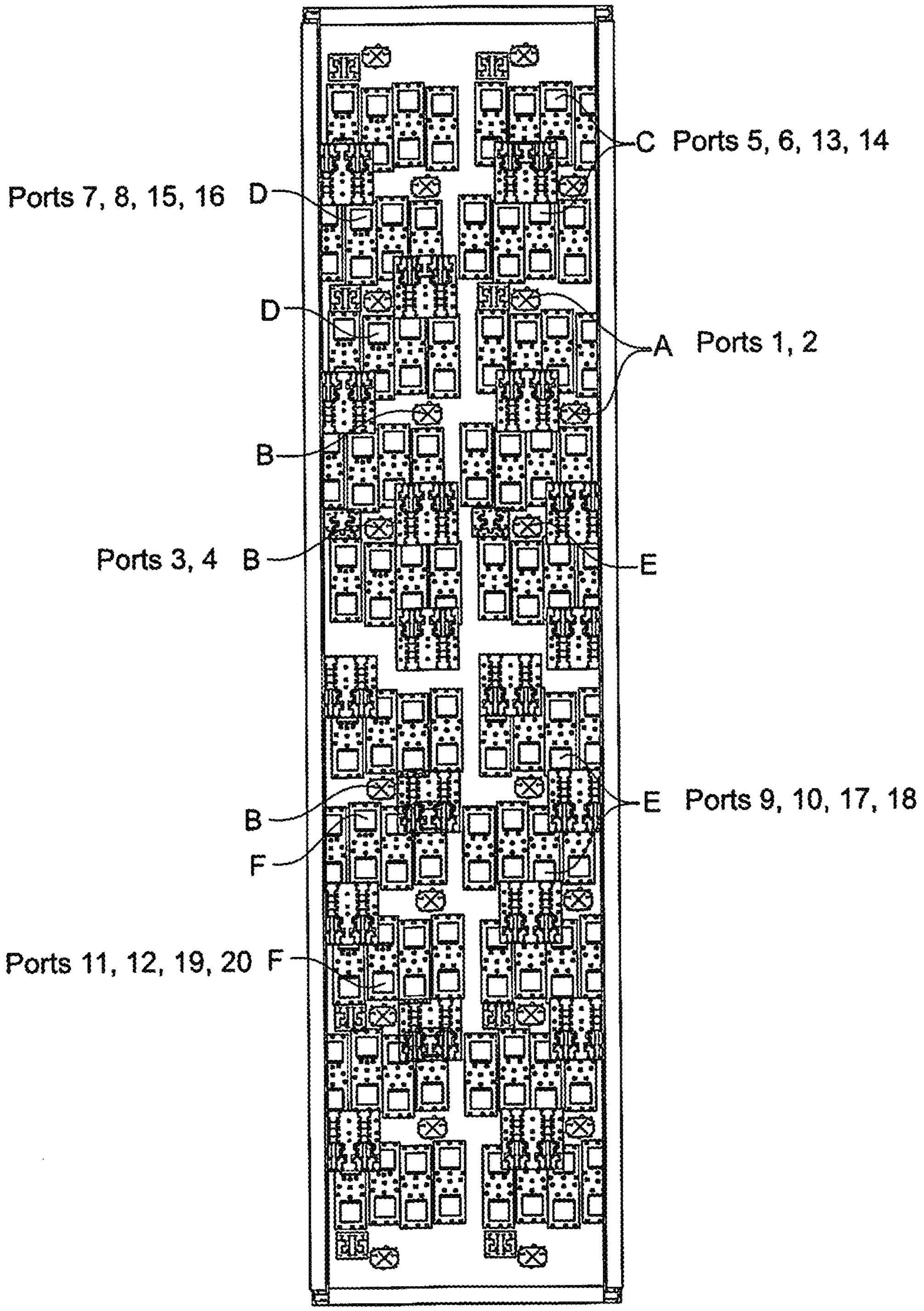
FIG. 1 PRIOR ART
FIG. 1 illustrates a prior art antenna architecture for a side-by-side midband bisector array with eight columns of midband elements and two columns of lowband 65 deg array.
Figure 2:
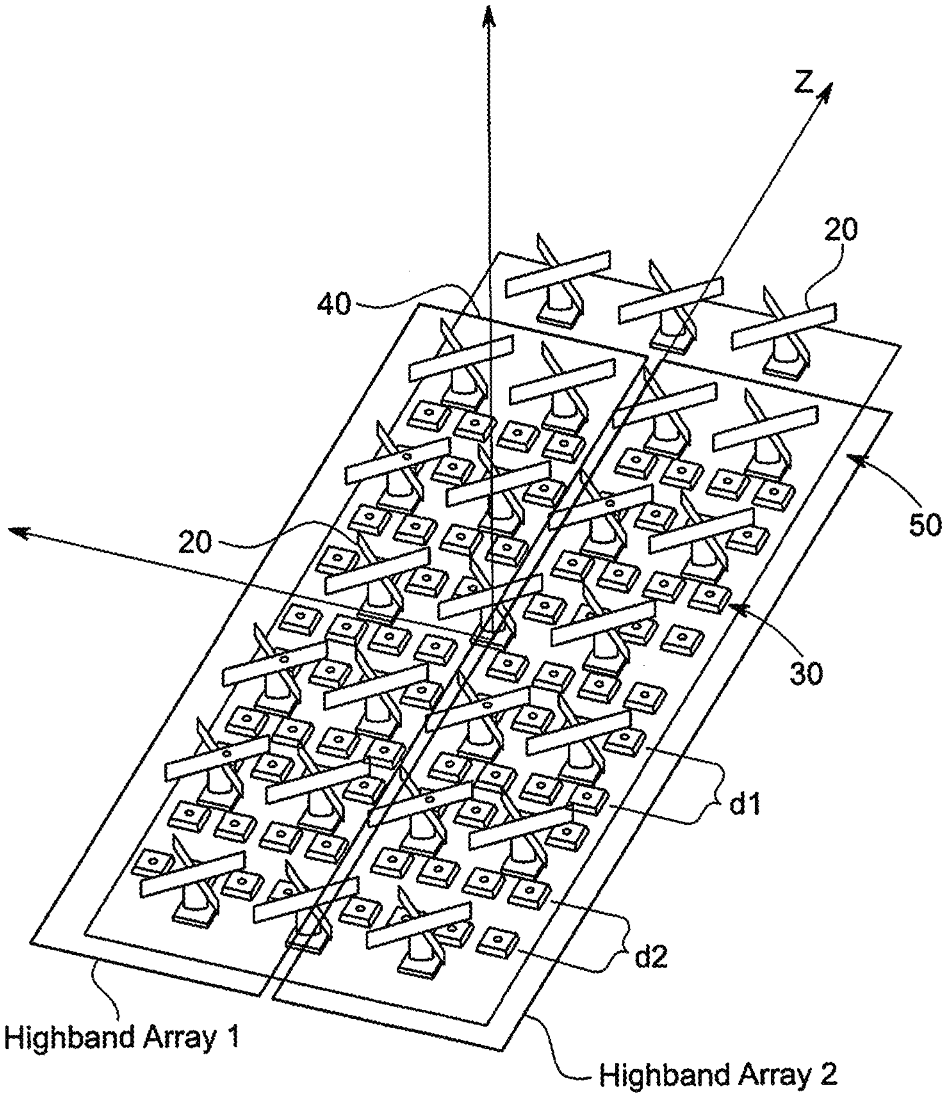
FIG. 2 PRIOR ART
FIG. 2 illustrates another prior antenna architecture for a side-by-side midband bisector array with eight columns of misband elements and a bisector lowband array.

As explained above, the embodiments shown in both FIGS. 3A and 3B are narrower than the prior art implementation of FIG. 1 which does not have a central interleaved column. As a specific example, the prior art antenna shown in FIG. 1 is 662 mm width and the embodiments shown in FIGS. 3A and 3B are only 496 mm wide-netting a 166 mm reduction in width. The interleaved central column that shares elements from both the left and right side arrays accounts for a majority of the width reduction. Also such architecture allows for other improved structuring to even further reduce width including, such as removal of azimuth staggering, reducing the general spacing of side by side arrays and some mechanical margins. For example, in the examples of FIGS. 3A and 3B the width reduction of 166 mm can be accounted to be 70 mm from the reduction of one column, 30 mm reduction of spacing between adjacent arrays, 35 mm by omitting staggering, and 31 mm other allowable mechanical changes. In any case, the central center column including elements from both side by side arrays and the reduction in total columns by one greatly improves the width footprint over the prior art.

To summarize the architecture of antenna 10 with four-eight row arrays of elements 16, 18, 20 and 22 as shown in FIGS. 3A and 3B, have total seven columns in width with FIG. 3A showing an array of 3,3, 4,4, 3,3, 4,4 pattern (elements 18 and 22) entangled with an array of 4,4, 3,3, 4,4, 3,3 pattern, (elements 16 and 20), and FIG. 3B showing an array of 4,3, 4,3, 4,3 4,3 pattern (elements 16 and 18) entangled with an array of, 4, 3,4, 3,4, 3,4 pattern (elements 18 and 22). The above descried arrangement is intended to be exemplary. Such features may be equally applied to other antenna arrangements with different numbers of columns, rows, and for different frequency bands.

For example, both antennas 10 shown in FIGS. 3A and 3B may include arrays that have 10 rows of elements instead of eight rows per array This would simply be a larger version of that shown in FIGS. 3A and 3B with more total elements per array. FIGS. 3A and 3B each have twenty eight elements each of elements 16, 18, 20, and 22. But the alternative arrangement with ten rows per array would have either thirty-four/thirty-six elements 16, 18, 20, and 22 per array (when alternating every two elements in the center column) or thirty five elements 16, 18, 20, and 22 per array (when alternating every other element in the center column), all with the same repeating interlocking pattern repeating down the vertical length of antenna 10.

It is noted that in FIGS. 3A and 3B antenna elements 16, 18, 20, and 22 are illustrated as patch elements, but it is understood that the invention is not limited in this respect. For example, similar architecture and interlocking of array/array elements may be achieved with dipole elements or any other type of radiating elements that could be used on an antenna and benefit from the reduced width provided, as shown for example in the following examples in FIGS. 4 and 5.

Figure 4:
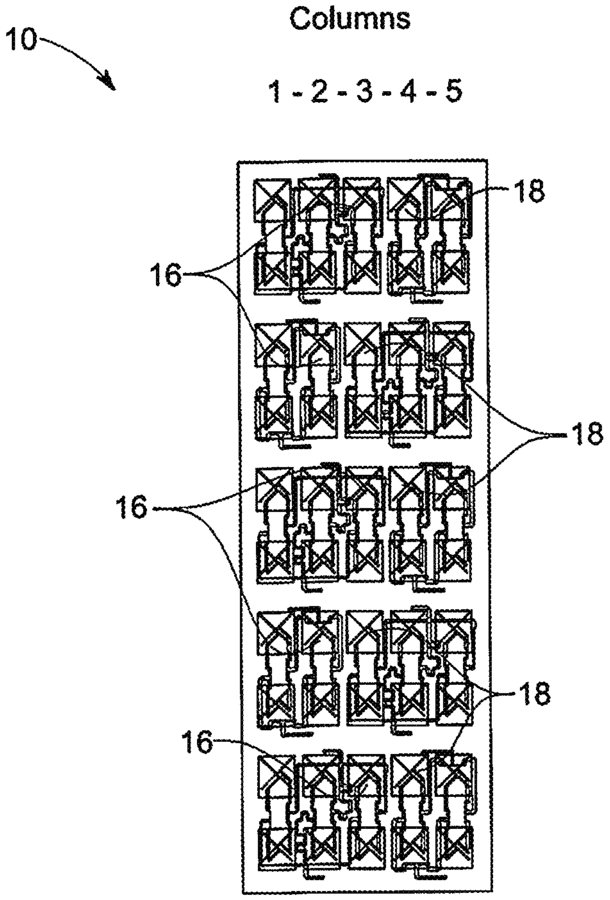
FIG. 4 illustrates an exemplary antenna architectures for two side by side 33 deg broadside arrays with entangled interweaved mid band arrays with five columns and a common center point line, in accordance with another embodiment.

Also in another embodiment shown in FIG. 4, a broadside 33 deg antenna 10 with five total vertical columns (instead of prior art six columns) can be arranged where for example each array of elements 16, arranged in ten rows, can have an array on a left side with a 3,3, 2,2, 3,3, 2,2, 3,3 pattern (e.g. rows one and two have three elements, rows three and four have two elements, etc . . . ) and the interlocking array of elements 18 on the right side of antenna 10 would be 2,2, 3,3, 2,2, 3,3, 2,2 pattern (e.g. rows one and two have two elements, rows three and four have three elements, etc . . . ). In this arrangement elements from the left side array would fill all of vertical columns one and two and elements from the right side array would fill all of vertical columns four and five with a central column three having elements from both the left and right array alternating each array every two rows. As with the width reduction in embodiments of FIGS. 3A and 3B relative to prior art FIG. 1, this embodiment also results in a reduction of about 60 mm (240 mm down from the prior art 300 mm width).

Figure 5:
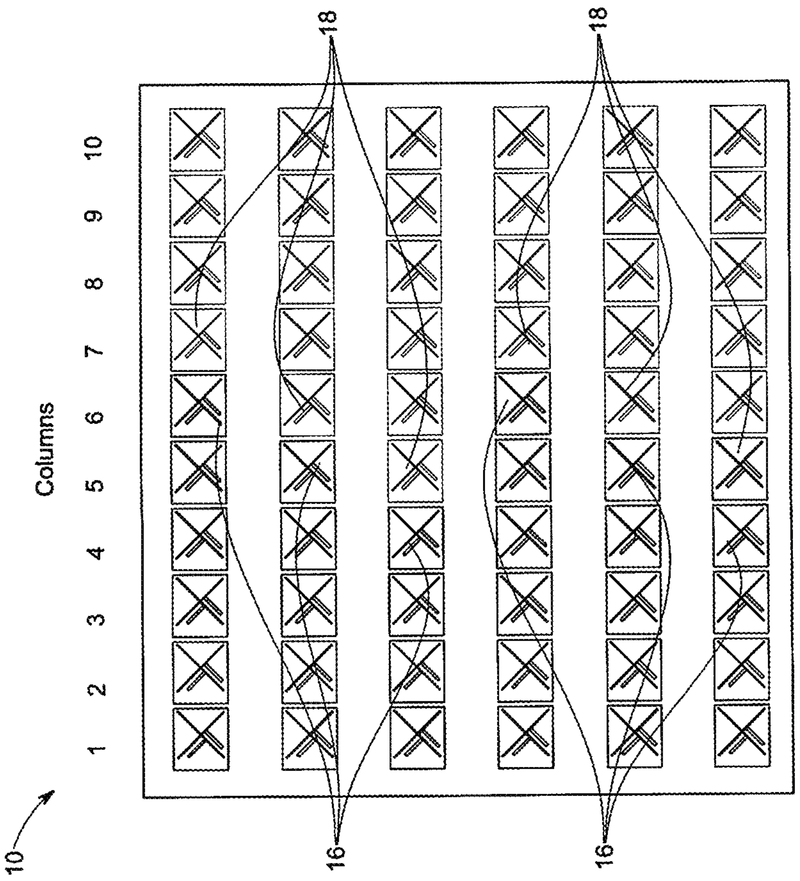
FIG. 5 illustrates an exemplary antenna architecture for a side-by-side multibeam arrays with entangled interweaved mid band arrays with ten columns and a common center point line, in accordance with another embodiment.

In yet another embodiment shown in FIG. 5 such an interweaved design can include further reducing number of columns by more than one, such as from twelve columns to ten, by using the same entangling concept used. For example, an antenna with two side by side arrays each having six rows, rows one through six, can be arranged in ten vertical columns one through ten (instead of prior art twelve columns). As with the width reduction in embodiments of FIGS. 3A and 3B relative to prior art FIG. 1, this embodiment also results in a reduction of about 100 mm (460 mm down from the prior art 560 mm width).

This arrangement of elements 16 could be a 6, 5, 4, 6, 5, 4 pattern for the left side array which is interleaved with a right side array of elements with a 18 with 4, 5, 6, 4, 5, 6 pattern. This would mean that row one of the antenna would have six elements 16 from the left side array and four elements 18 from the right side array. Row two would have five elements 16 and 18 from both the left and right side arrays. Row three would have four elements 16 from the left side array and six elements 18 from the right side array. The pattern would repeat for rows four, five and six. This would mean that vertical columns one, two, three, and four would only have elements from the left side array and columns seven, eight, nine, and ten would only have elements form the right side array, with columns five and six having elements from both arrays depending on the row.

Figure 6:
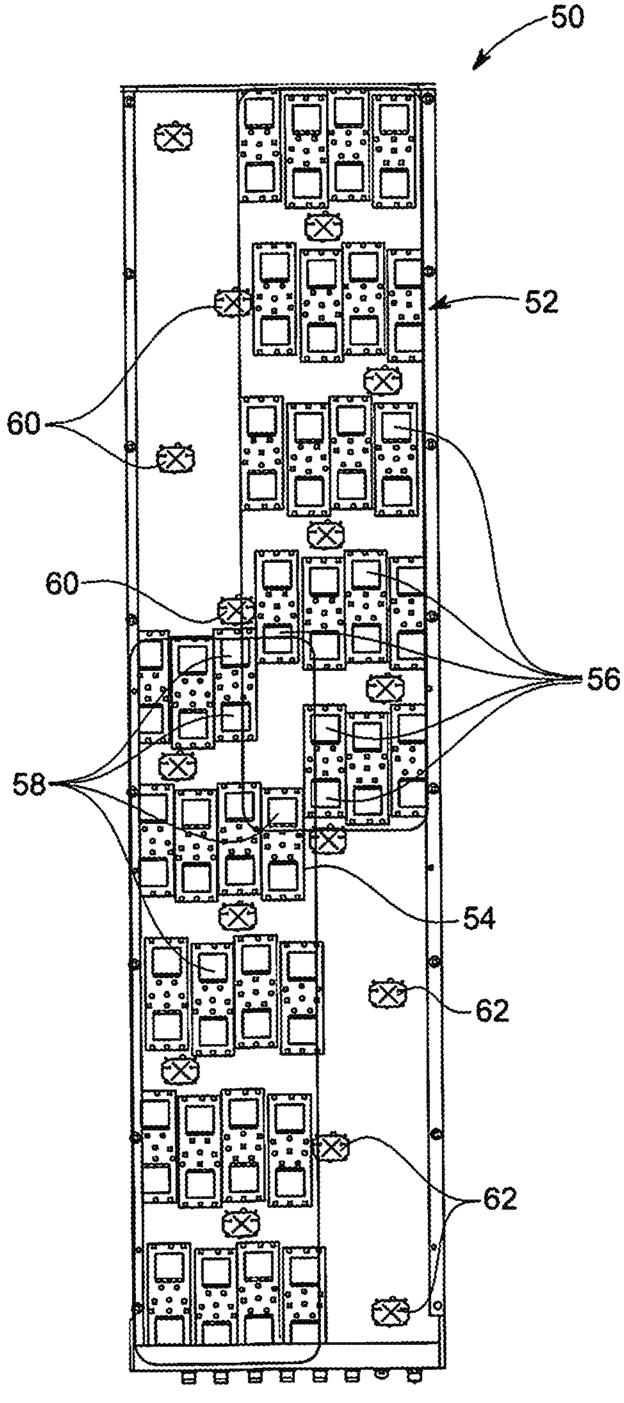
FIG. 6 illustrates a partial interweaved structure of arrays, in accordance with another embodiment.

In another embodiment as shown in FIG. 6, two 4×4 MIMO array 50 is illustrated with two over lapping mid band groups 52 and 54. This array provides a 4×4 MIMO per beam. As shown in the figure, top group 52 is offset to the right side of array 50 with bottom group 54 offset to the left. Top group 52 is made from a series of patch elements 56 arranged as a 4, 4, 4, 4, 3, pattern and bottom group 54 is made from a series of patch elements 58 arranged as a 3, 4, 4, 4, 4 pattern. Such an embodiment can also support two staggered vertical columns of dipoles 60 and 62 to form a low band 4×4 MIMO. This reduces the width from 560 mm in prior art to 496 mm.

Starting from the top of array 50, in the arrangement shown in FIG. 6 there are seventeen horizontal rows with elements 56 of top group 50 occupying only top rows one through ten, and elements 58 of bottom group 54 occupying bottom rows eight through seventeen. Thus, across row one vertical columns one through three are empty (aside from the separate low band elements 60 and 62), and columns four through seven have an element 56. The same is true of rows two through seven. In rows eight through ten, elements 56 only occupy columns five through seven with elements 58 occupying columns one through three. There are no elements 56 or 58 in column four in row nine. Regarding the bottom group 54, elements 58 in rows eight and nine occupy columns one through three. In rows ten through seventeen elements 58 occupy rows one through four.

As with FIGS. 3A and 3B the center column four is shared by both top and bottom groups 52 and 54 with elements 56 in column four, rows one through eight, and with elements 58 occupying column four, rows ten through seventeen (row nine column four is empty.) Such antenna 50 can have a twelve ports array with narrow width while the gain of each array is increased by having ten rows instead of eight rows. Ports five through twelve supply groups 52 and 54 to form the mid band 8×8 MIMO and ports one through four supply two staggered vertical columns of dipoles 60 and 62 to form a low band 4×4 MIMO.

Figure 8A:
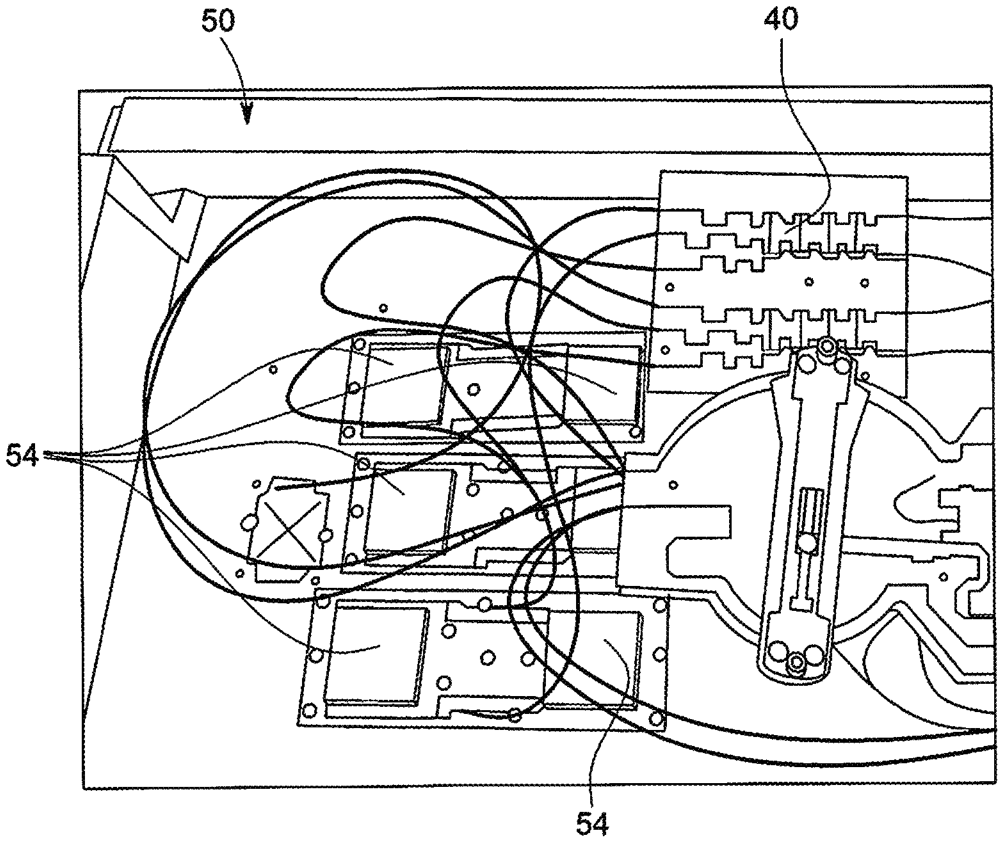
FIGS. 8A and 8B illustrate a partial array from FIG. 3A and a ABFN (Azimuth Beamforming Network-FIG. 6B) in accordance with one embodiment.
Figure 8B:
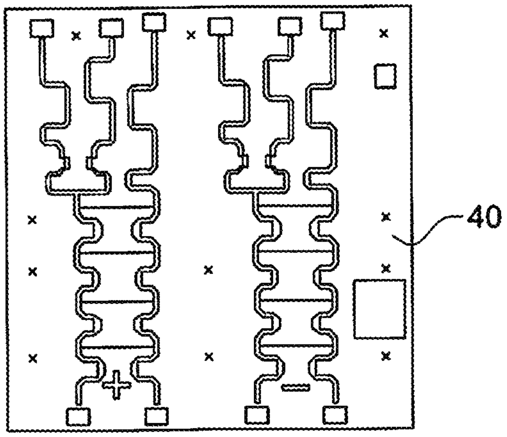

In one embodiment it is noted that an exemplary new azimuth beamformer for the three/four column antenna arrangement was designed for use for example in supplying signals to such test arrays from antenna array 10 and 50. FIG. 8A for example illustrates a partial picture of a 33, 44, 44, 44, 44 antenna 50, similar to top group of elements 54 of FIG. 6. A three column beamformer 40 is shown in schematic in FIG. 8B and placed next to elements 54 in FIG. 8A.

Beamformer 40 may be implemented as a three output BFN (Beam Forming Network) that produces two bisector beams by introducing 90 deg/−90 deg phase difference between columns and excitation amplitude of 0.7,1,0.7. The input ports of beamformer 40 may be assigned in a way that produce absolute phase matches with four columns beamformer used in the rows with four columns. For example, to have the correct phasing for the desired elevation pattern, phase center of rows with three column and rows with four column should match. This phase center depends if the omitted columns is the farthest right or farthest left column.

In order to confirm the pattern effectiveness as well as azimuth sidelobe and gain performance at least two prototypes proving the above concept were built and tested with an array similar to the left array of this design to see the effect on pattern and directivity.

Figure 7:
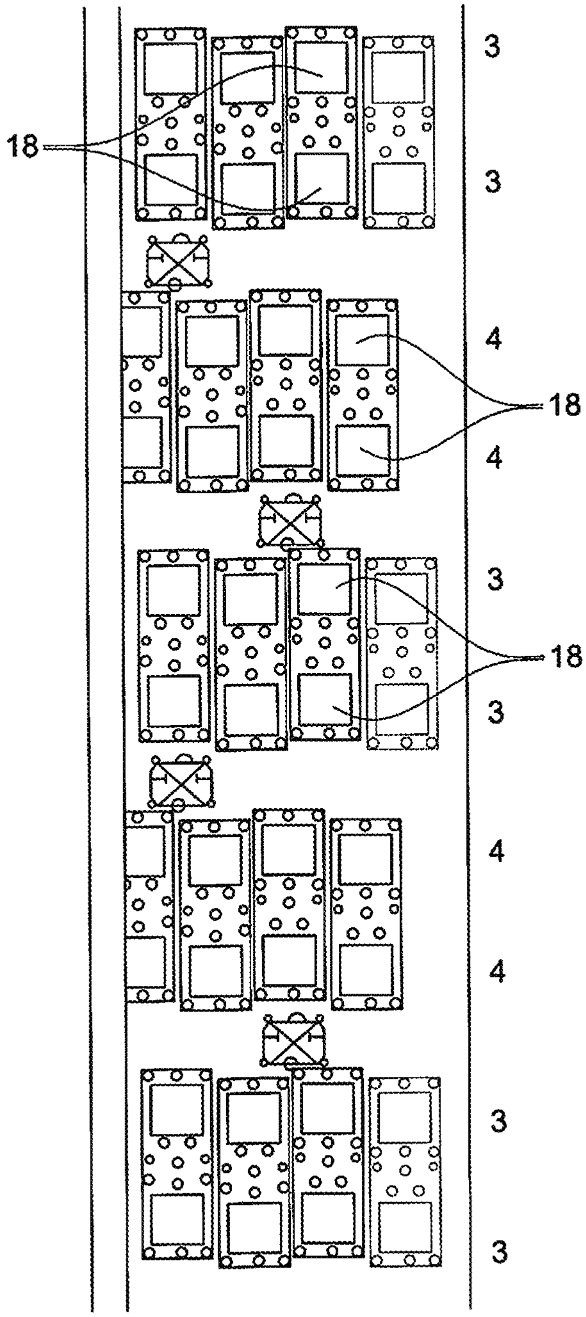
FIG. 7 illustrates an exemplary partial array architecture of from FIG. 3A in accordance with one embodiment.

For these prototypes, one array of elements 58 was made with 3,3, 4,4, 4,4, 4,4, 4,4 pattern (similar to bottom group of FIG. 6 from antenna 50) and another array of elements 18 shown in FIG. 7 with 3,3, 4,4, 3,3, 4,4, 3,3 architecture (i.e. FIG. 7 is similar the top left of antenna 10 of FIG. 3A).

Figure 9A:
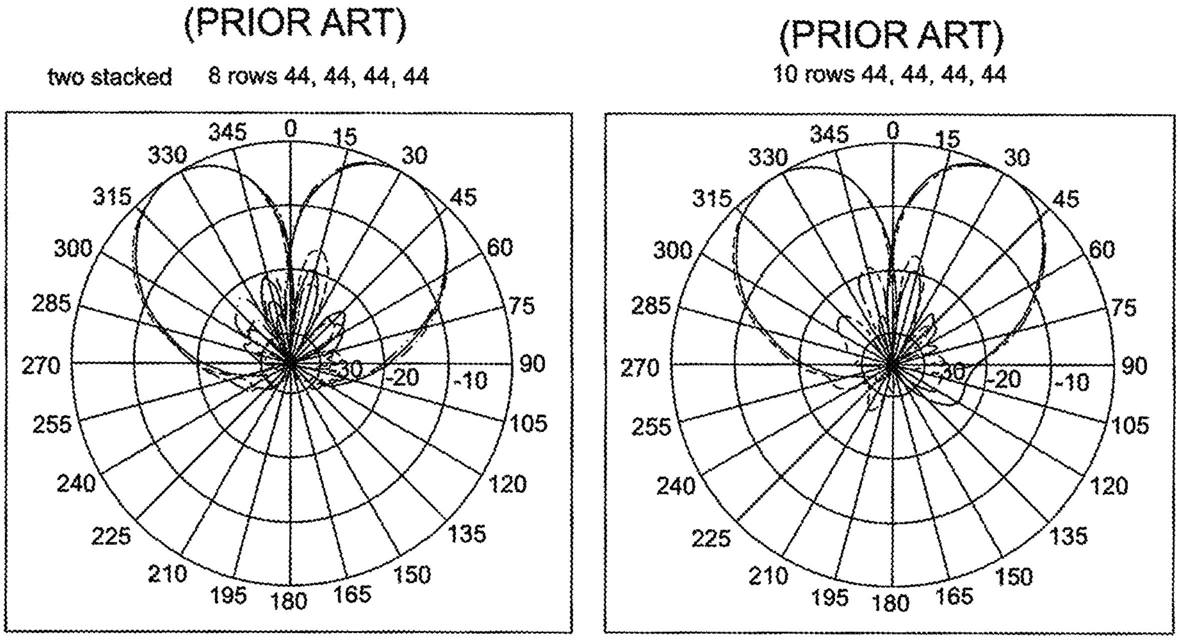
FIGS. 9A and 9B illustrate four coverage patterns comparing azimuth (FIG. 7A) and elevation (FIG. 7B) of exemplary arrays compared to the prior art.
Figure 9A:
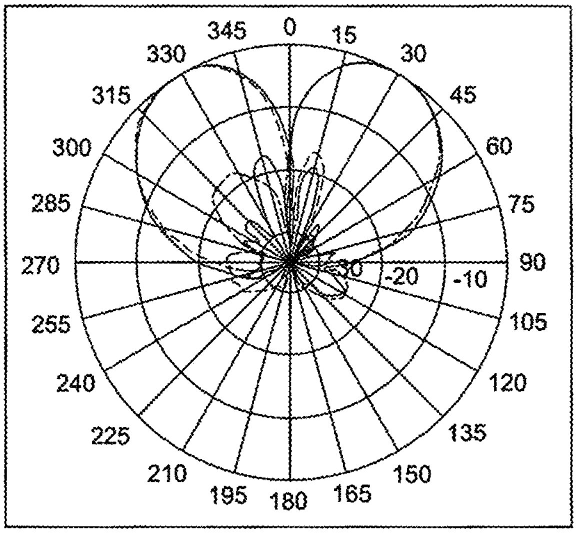
Figure 9A:
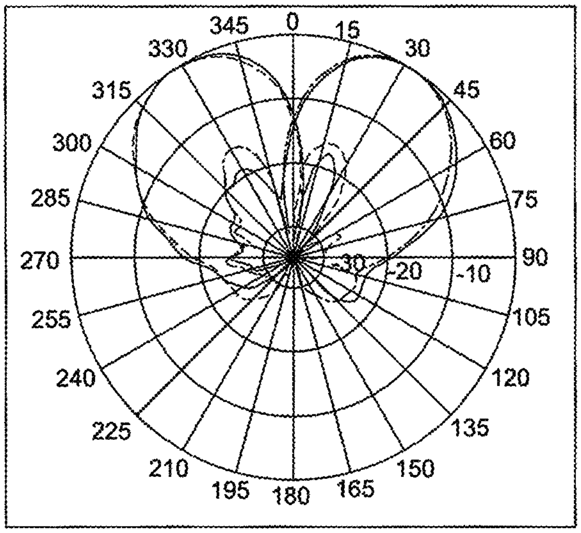
Figure 9B:
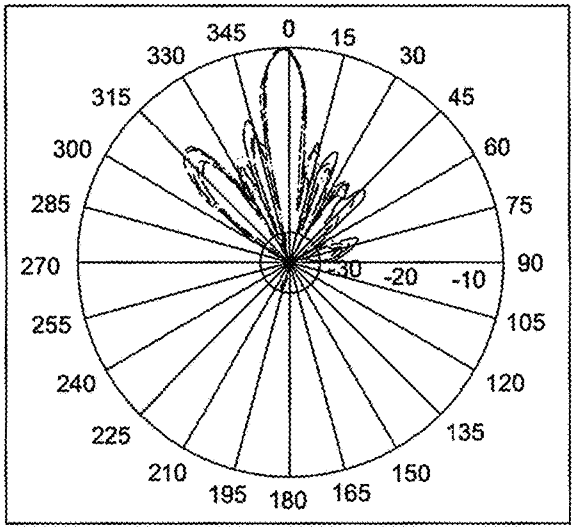
Figure 9B:
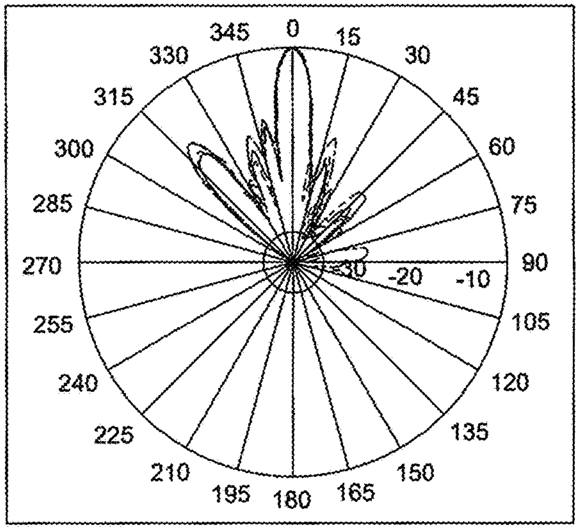
Figure 9B:
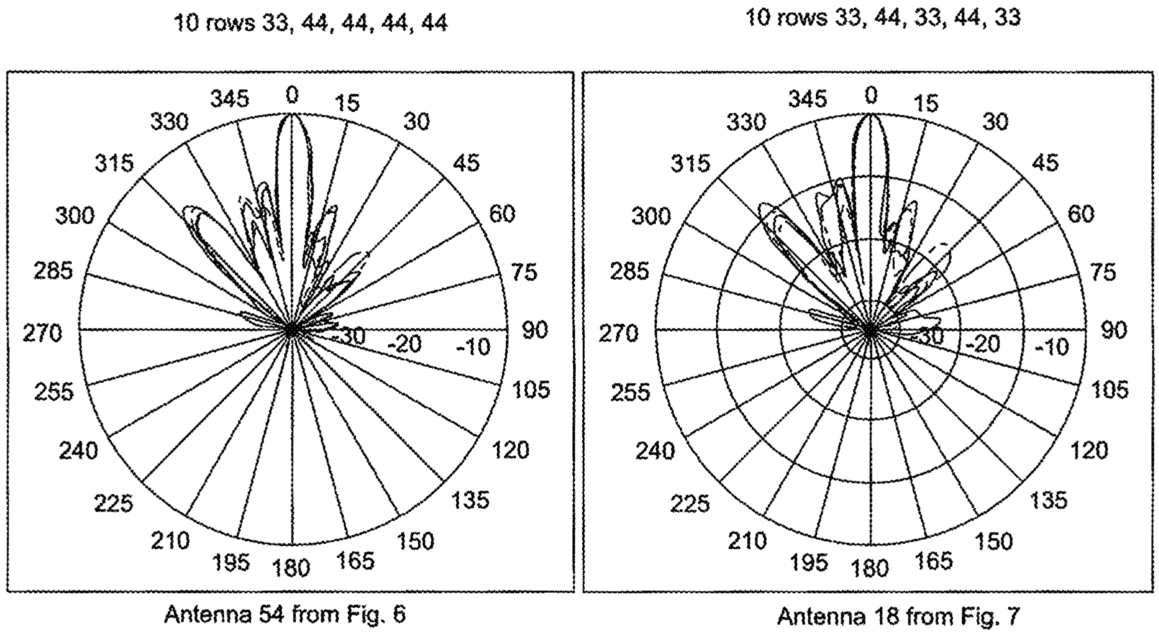

FIGS. 9A and 9B compare the azimuth and elevation patterns of the prior art ten rows 4,4, 4,4, 4,4, 4,4, 4,4 (prior art FIG. 1) and eight rows 4,4, 4,4, 4,4, 4,4 (prior art not shown), architecture, also prior art, compared with the two embodiments of the present invention, with ten rows 3,3, 4,4, 4,4, 4,4, 4,4 pattern (e.g. FIG. 6) and ten rows 3,3, 4,4, 3,3, 4,4, 3,3 (similar to the arrangement shown in FIGS. 7/3A) with the elements being mid-band type patch elements (e.g. 58 or 18) covering 1695-2690 MHz. The azimuth comparisons are shown in FIG. 9A and the elevation patterns comparison are shown in FIG. 9B.

As can be seen in FIGS. 9A and 9B there is only slight changes in the shape of azimuth and elevation pattern which shows that the present seven column antennas 10 in FIGS. 6 and 7 have essentially the same performance and patterns as the prior art eight column antenna of prior art FIG. 1 while being physically around 100 mm narrower. Also, as expected, all of the ten row architecture antennas have narrower elevation beam width compared to eight rows architecture (6.6 deg for ten rows compared to 8.4 deg for eight rows).

Figure 10:
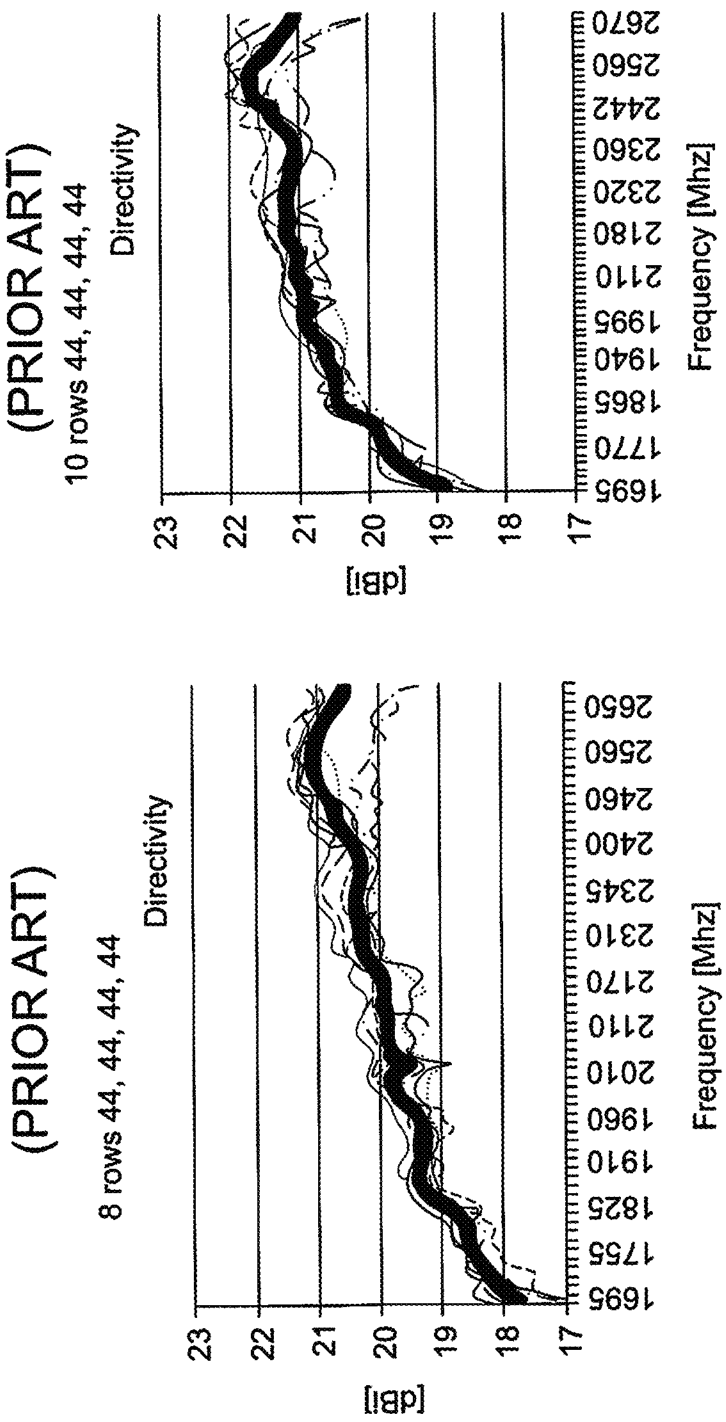
FIG. 10 illustrate graphs comparing the directivity of exemplary arrays compared to the prior art.
Figure 10:
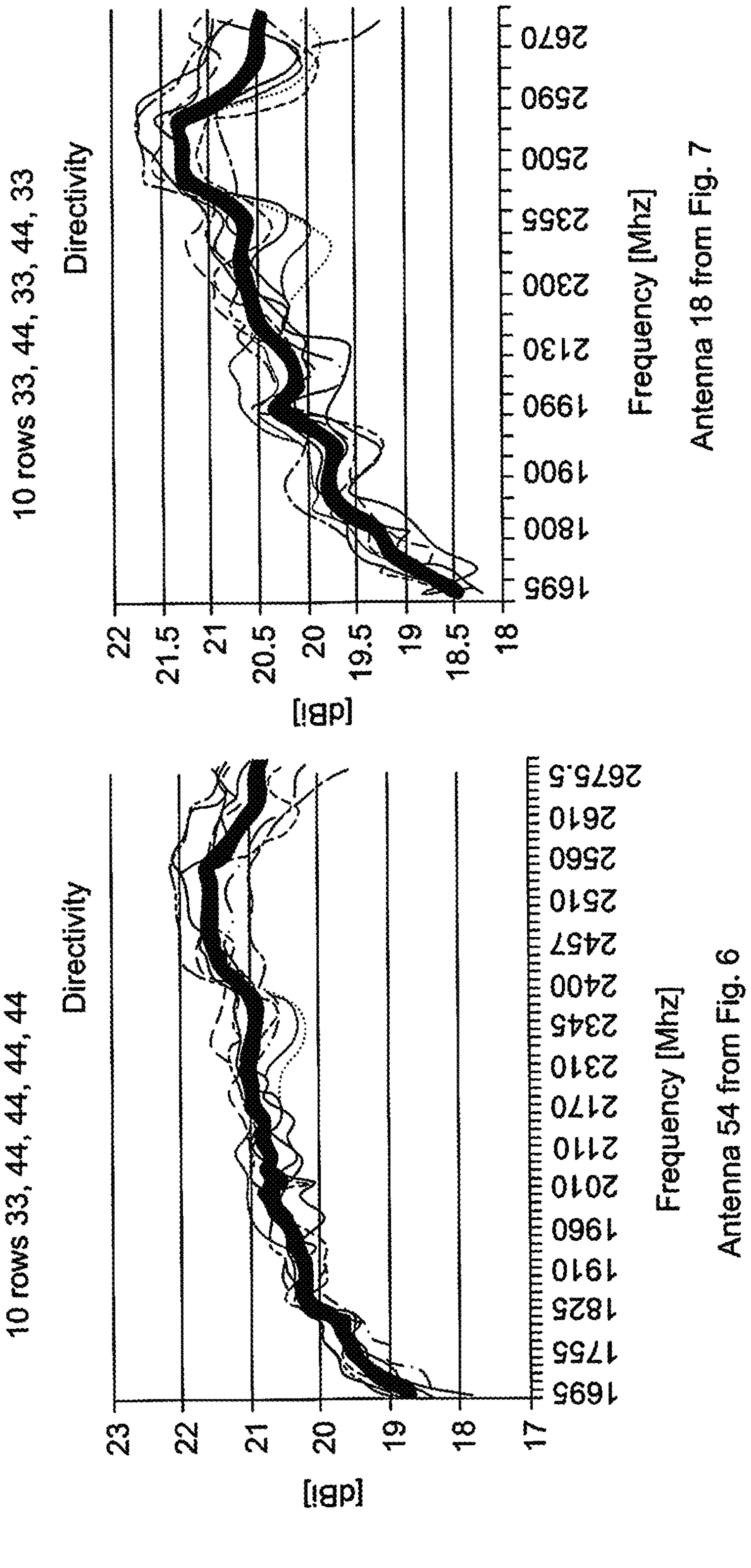

FIG. 10 compares the array directivity (i.e. maximum value of directive gain of antenna solely determined by radiation pattern of antenna and not considering antenna loss) of the above mentioned sample architectures as compared in FIGS. 9A and 9B. As can be seen, the present embodiment of 3,3, 4,4, 4,4, 4,4, 4,4 pattern (e.g. FIG. 6) has almost the same directivity as 4,4, 4,4, 4,4, 4,4, 4,4 pattern of prior art such as the one illustrated in FIG. 1. The full entangled/interweaved present embodiment of 3,3, 4,4, 3,3, 4,4, 3,3 pattern (e.g. FIG. 7) also has good directivity which is 0.5 dB better compared to eight rows 4,4, 4,4, 4,4, 4,4 prior art architecture.

In another embodiment, the present arrangement may be used to provide improved 4×4 MIMO antenna (65 degree or 45 degree). As noted above, prior art 4×4 MIMO 65 degree antennas are usually formed using two staggered columns of elements as shown for example in FIG. 11 (prior art). However, because the two columns are staggered to control the azimuth bandwidth to 65 degrees, there is a limited number of elements per column (e.g. eight elements per column in FIG. 11) so there is limitations on the gain from this antenna.

Figure 12:
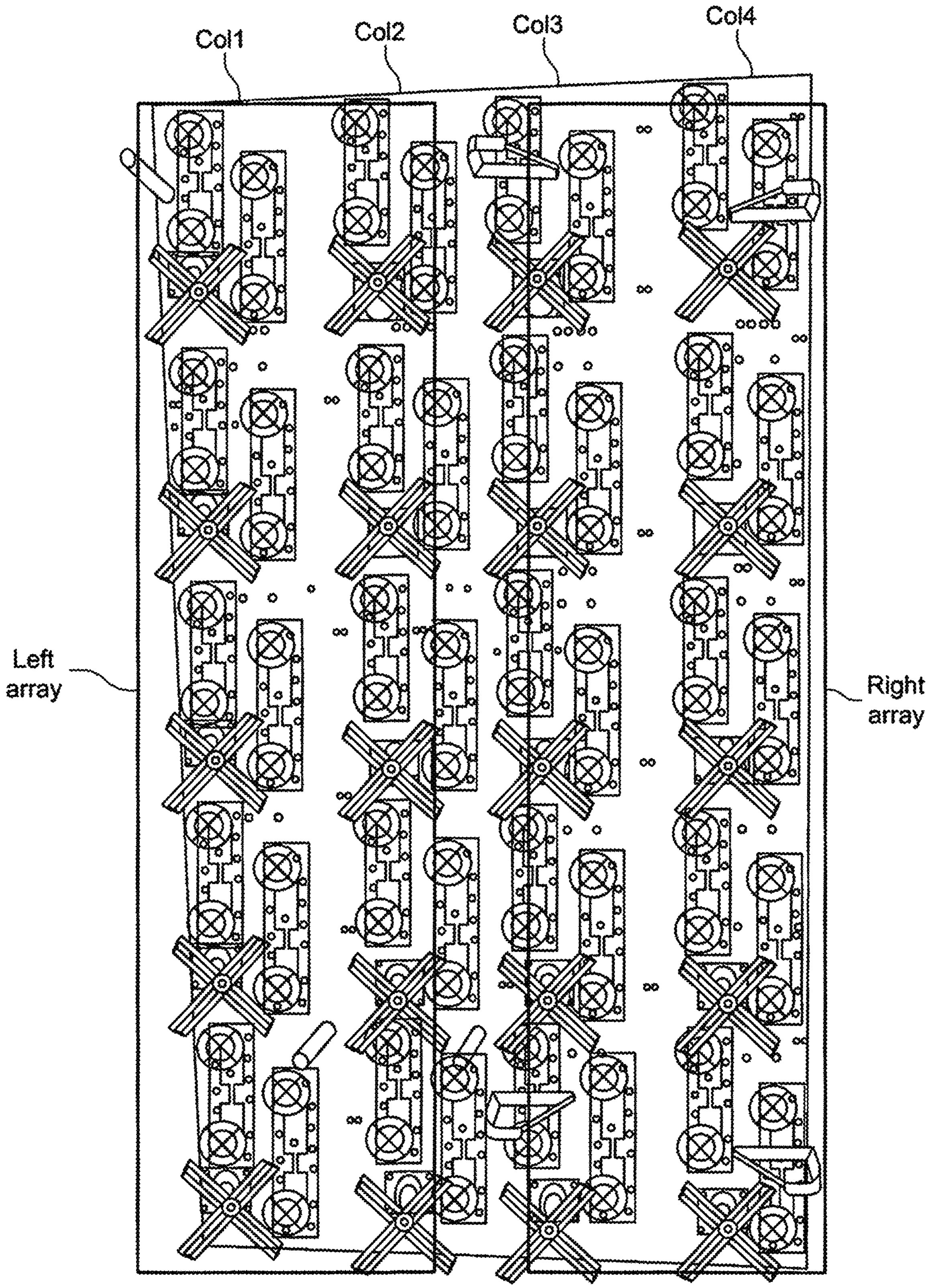
FIG. 12 (Prior Art)
FIG. 12 shows a prior art 4×4 MIMO 45 degree antenna.

Regarding, 4×4 MIMO 45 degree antennas, these are typically made using four columns of antennas to achieve the designed azimuth 45 degrees as shown in prior art FIG. 12. Here because two columns of elements are needed to achieve a 45 degree signal pattern (e.g. with about 200 mm spacing between columns) each array (left and right) has ten (10) elements in two columns of five (5) so the antenna gain is adequate, but the footprint is excessively wide.

Figure 11:
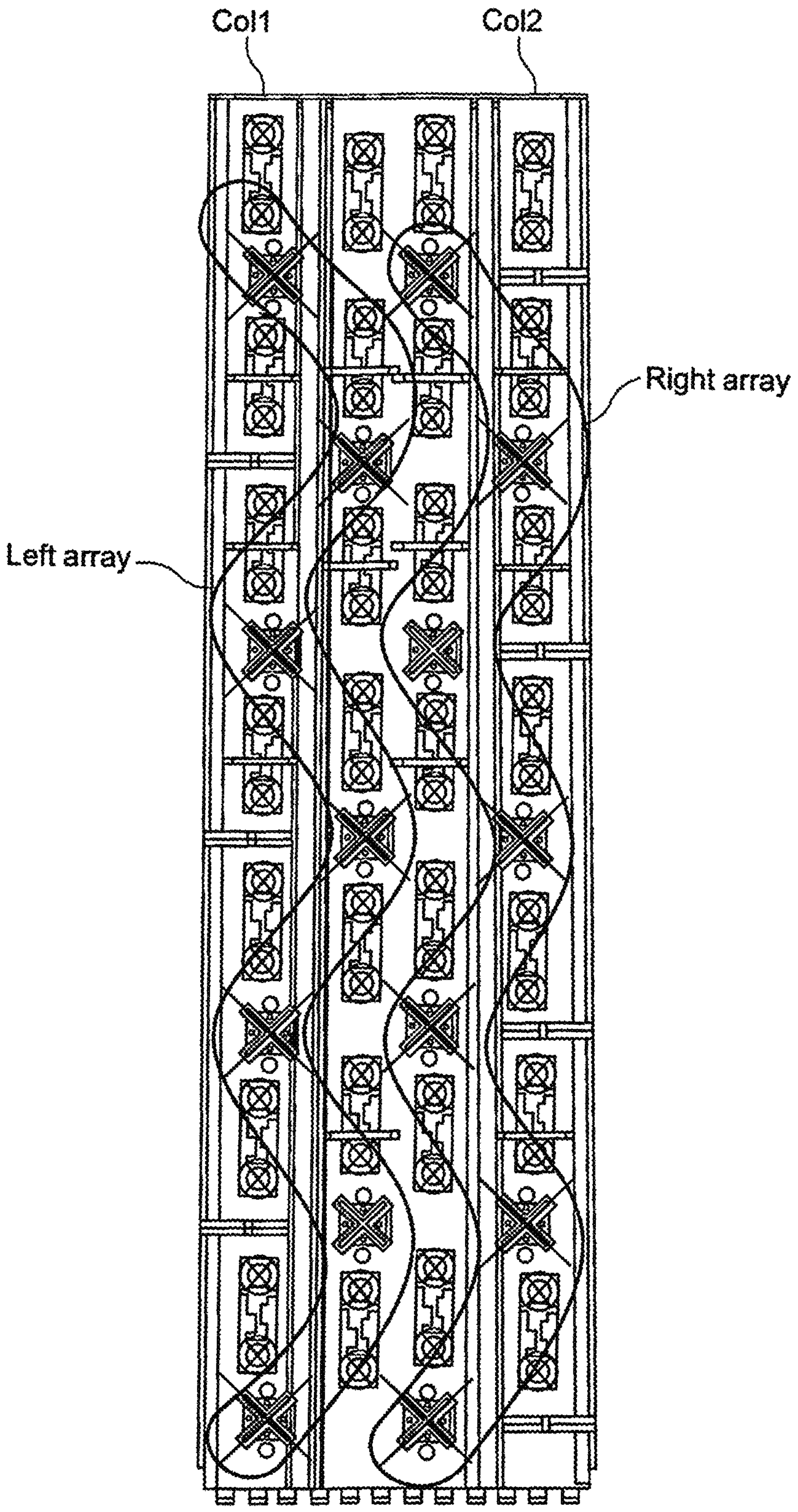
FIG. 11 (Prior Art)
FIG. 11 shows a prior art 4×4 MIMO 65 degree antenna.

It is noted that in both prior art FIGS. 11 and 12 the left and right arrays identified are for the low band dipoles as indicated. The remaining smaller midband dipoles on the same reflector are shown only for context that in many instances the 4×4 MIMO being discussed may be practically implemented on an antenna that has multiple frequency band arrays.

Figure 13:
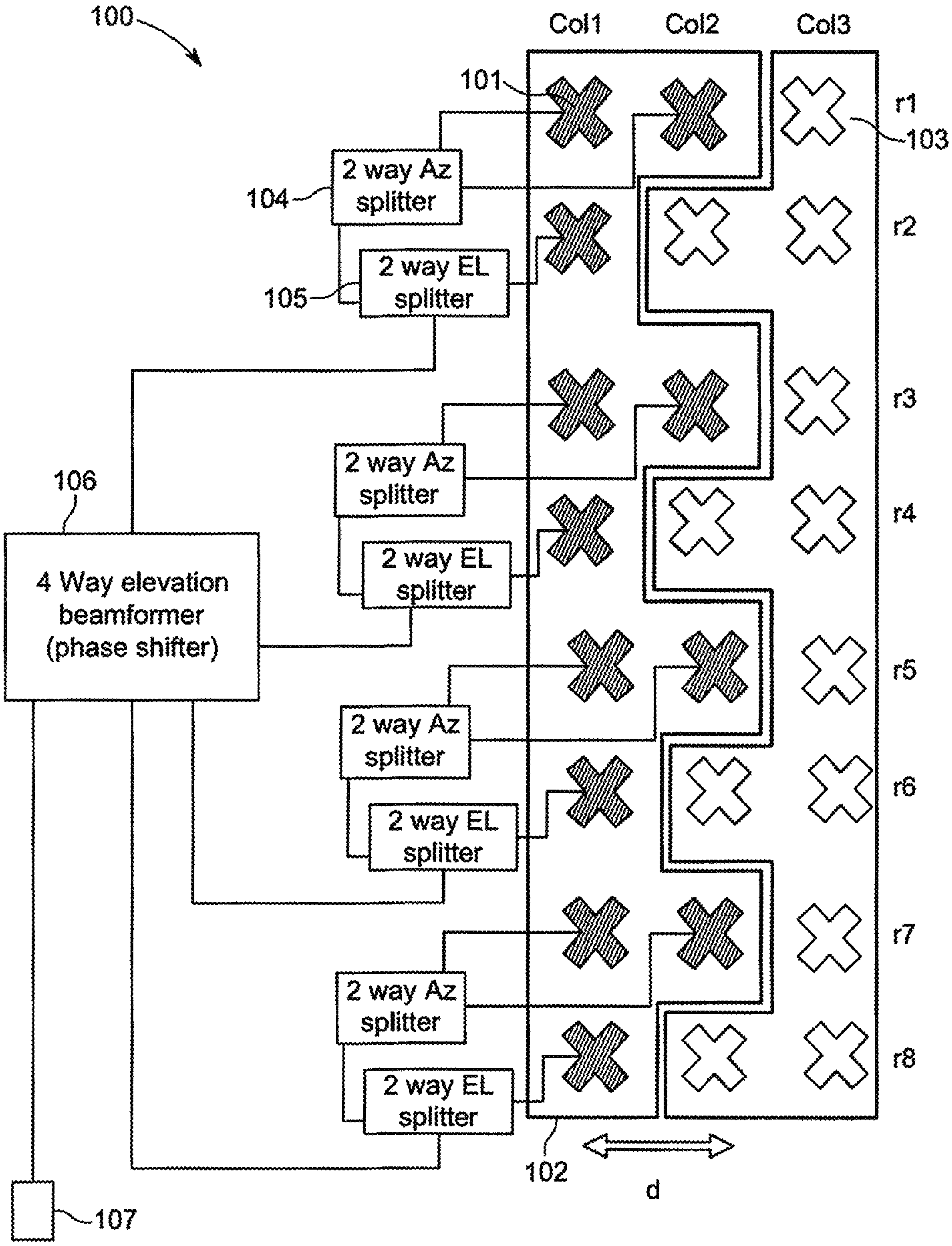
FIG. 13 shows a three column 4×4 MIMO antenna with a shared middle column, in accordance with one embodiment.

The present arrangement as illustrated in FIG. 13 provides an improved 4×4 MIMO antenna, in either 65 degrees or 45 degrees, where three columns of element are used, with a left array having one left column of elements and the right array using one right column of elements, and a central column of elements where elements of this column are shared with both the left and right arrays. It is noted that "65 degrees" and "45 degrees" as used throughout the description of FIGS. 13-21 below, are approximate (e.g. substantially 45 degrees and substantially 65 degrees). It is understood by those of ordinary skill in the art that such azimuth degree notations are not typically exactly 45 or 65 degrees, but these are used for close approximations of the azimuth beam width and that 45 and 65 degrees are used herein without repeating "approximately" so avoid excessive wordiness.

For example, as illustrated in FIG. 13, antenna 100 has eight (8) rows of antenna elements 101 arranged in three (3) vertical columns labeled column 1, column 2, and column 3, moving from left to right. There are two arrays 102 (left) and 103 (right) that form the 4×4 MIMO array. Left array 102 includes all the elements in left column #1 and every other element 101 in center column #2. Right array 103 includes all the elements in right column #3 and every other element 101 in center column #2. For simplicity the signal feed network is only shown for left array 102 but it is contemplated that it is the same for right array 103.

Azimuth splitters 104 connect two elements 101 in a single row between columns #1 and #2 in the instance where left array 102 has two elements in that row, while an elevation splitter 105 connects elements 101 from rows #1 and #2 together. This is repeated for each pair of rows (e.g. #1 and #2, #3 and #4, etc . . . ) As shown in FIG. 13, elevation splitters 105 are connected to a 4-way elevation beamformer 106 which includes phase shifter for tilting the beam from antenna 100. Finally, beamformer 106 is connected to one input port 107 of antenna 100 thus completing the element feed network for left array 102.

This architecture is the basic form for both 45 and 65 degree 4×4 MIMO antenna 100 according to the present arrangement. Specific considerations regarding how such architecture is implemented for a 45 degree application versus a 65 degree application are discussed in more detail below.

Figure 14A:
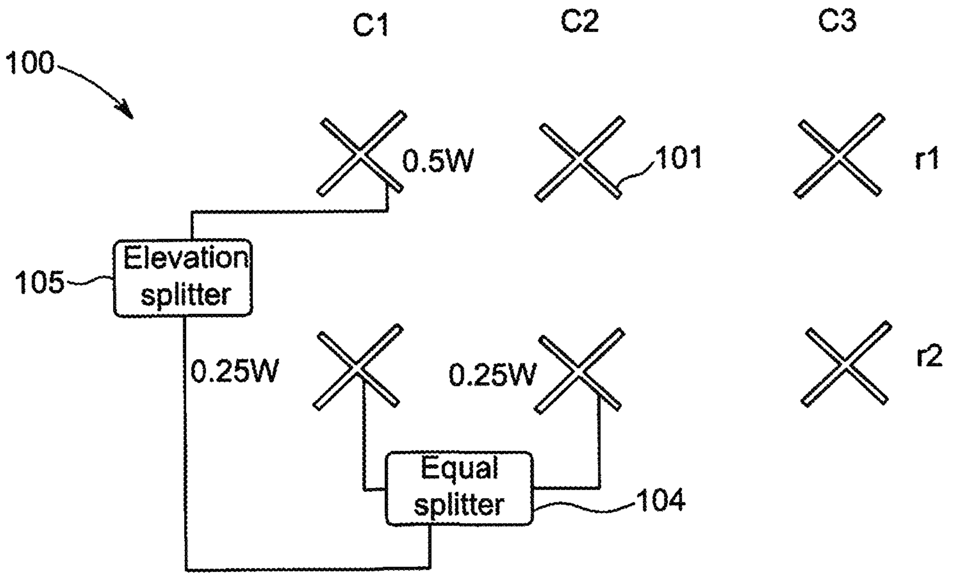
FIG. 14A shows a first arrangement implementing an equal azimuth splitter in the antenna shown in FIG. 13 for use on a row with elements in two columns.

As shown in FIG. 14A, it is further contemplated that elevation splitter 105 splits an exemplary 1 W of signal power to three elements 101 in the vertical direction and horizontal (??) direction (between row #1 and row #2) equally at 0.5 W. Azimuth splitter 104, coupled to elevation splitter 105, is configured to be an equal splitter and splits the signal in half again between element 101 in column #1 and element 101 in column #2 in row #2. This is repeated down columns #1 and #2 for each row pair in left array 102. Here the split between elements 101 in the same horizontal (azimuth) row is 0.25 W each.

Figure 14B:
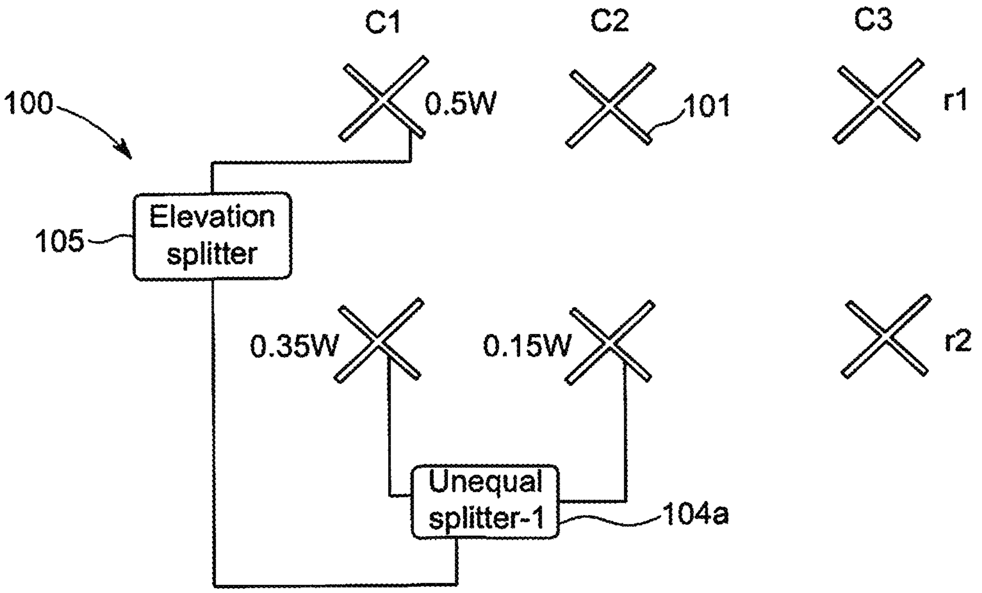
FIGS. 14B and 14C show additional arrangements implementing an unequal azimuth splitter in the antenna shown in FIG. 13 for use on a row with elements in two columns.

However, in another arrangement instead of using equal azimuth splitter 104 an unequal azimuth splitter 104*a* is used that can adjust the azimuth power split between two elements 101 on the same horizontal row (e.g. row #2 one in column #1 (left) and one in column #2 (center) within the context of left array 102. As shown in FIG. 14B element 101 in left column #1 receives 0.35 W of power while element 101 in center column #2, both within the same row #2 of left side array 102, receives on 0.15 W. In this case, as more power is supplied to the outside vertical column element 101 the azimuth beam width gets wider as this column is the principal column of left array 102. This approach may be used as needed to adjust the degree angle of 4×4 MIMO antenna 100.

Figure 14C:
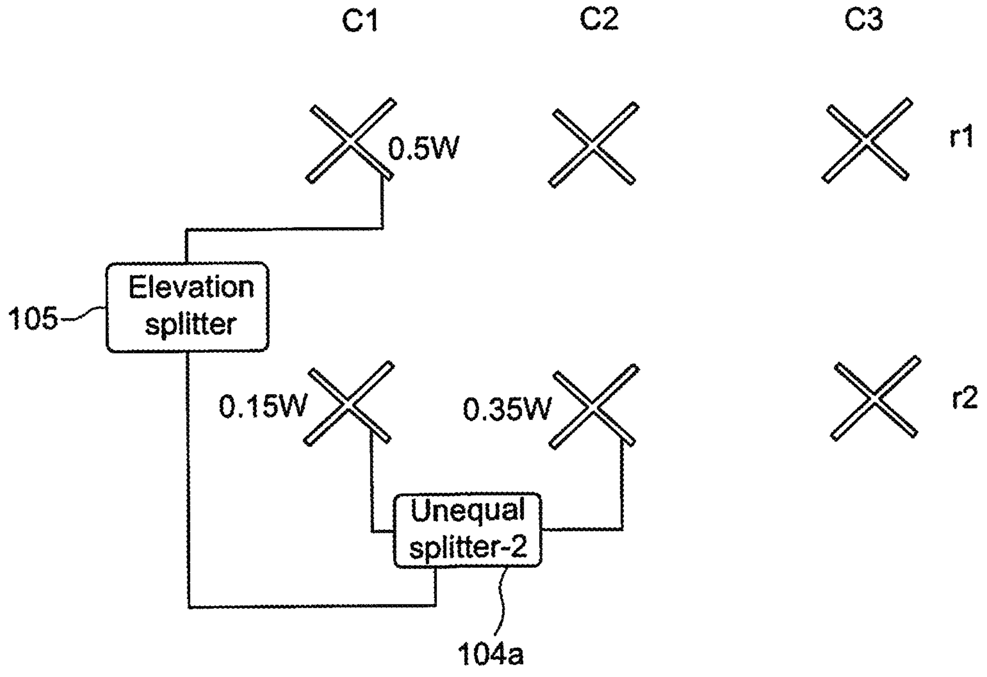

Alternatively, as shown in FIG. 14C, unequal azimuth splitter 104*b* is used to adjust the azimuth power split between two elements 101 on the same horizontal row #2 within the context of left array 102, such that element 101 in left column #1 receives 0.15 W of power while element 101 in center column #2, both within the same left array 102, receives 0.35 W. In this case, as less power is supplied to the principal vertical column element 101, the azimuth beam width gets narrower. Again, this provides a way to adjust the Az-BW slightly without changing the basic architecture of antenna 100.

For clarity, the arrangements of FIGS. 14B and 14C demonstrate that, in the present arrangement for antenna 100, if more power is supplied to the outside principal vertical column element 101 (e.g. in left column #1), in the rows where there are two elements in left array 102, the azimuth beam width of left array 102 gets wider and if less power is supplied to outside vertical column element 101, than the element 101 in shared center column #2 then the azimuth beamwidth gets narrower. It is noted that the 0.35 and 0.15 unequal weightings are exemplary and other variations on this may be used depending on the degree of widening or narrowing needed.

Figure 15:
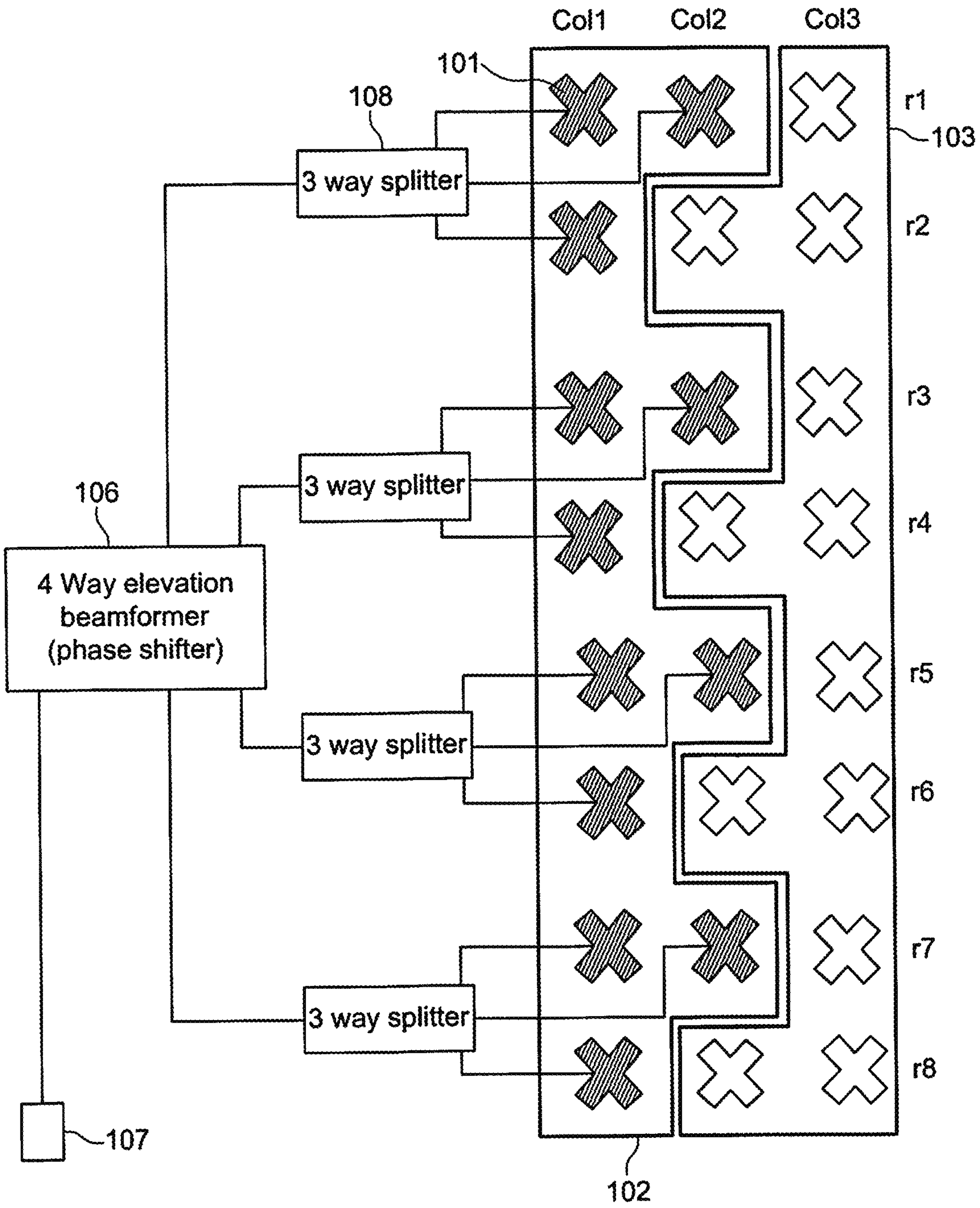
FIG. 15 shows an alternate three column 4×4 MIMO antenna from FIG. 13 using a three-way azimuth/elevation splitter, in accordance with one embodiment.

In another embodiment for antenna 100 shown in FIG. 15, 2-way azimuth splitters 104 and 2-way elevation splitters 105 may be replaced with a single 3-way splitter 108 that, with proper power splitting ratios, can replace both components, including adjusting to the desired azimuth beamwidth.

Figure 16:
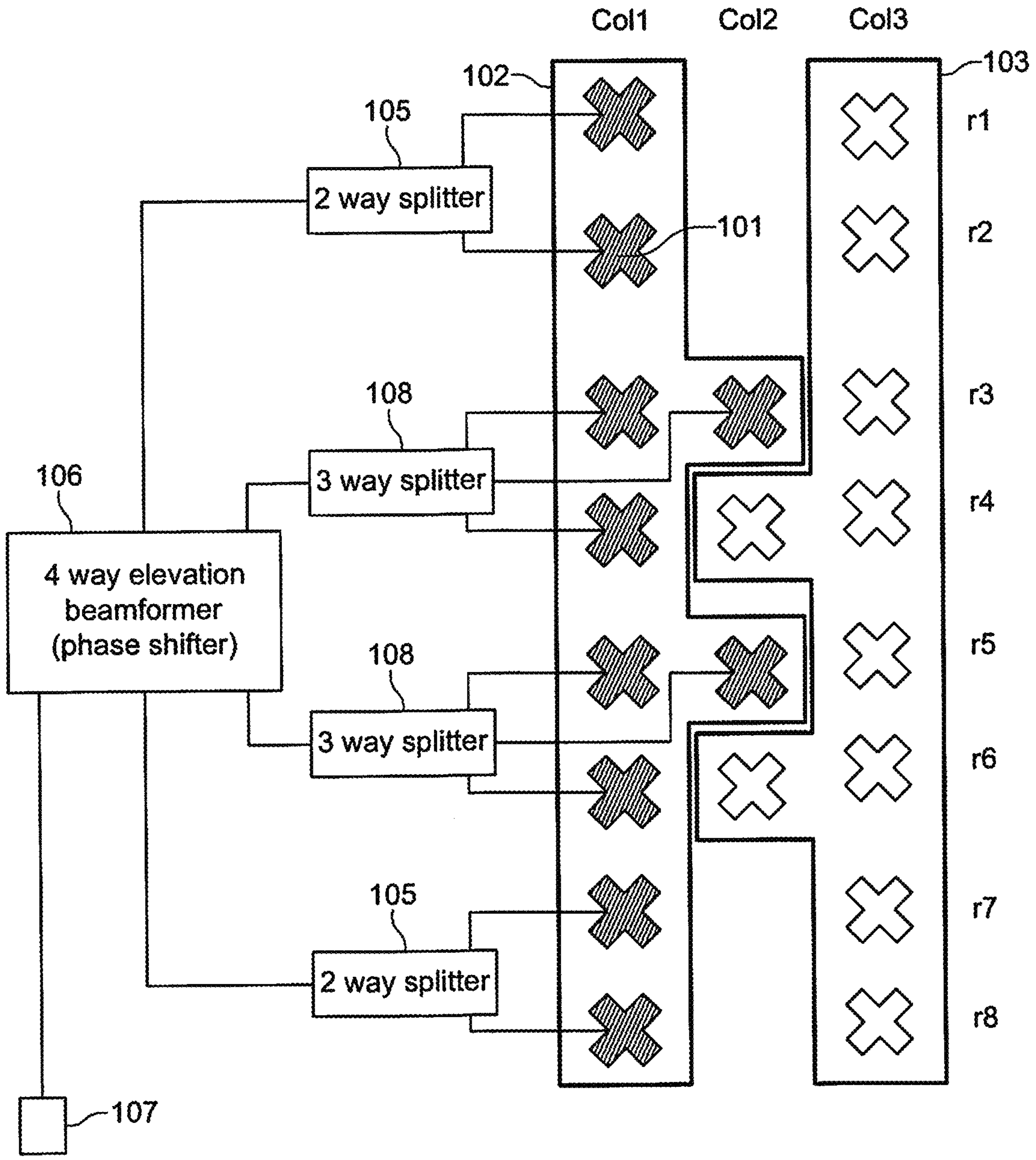
FIG. 16 shows an alternate arrangement of the three column 4×4 MIMO antenna from FIG. 13 with a reduced number of elements, in accordance with one embodiment.

In another embodiment of antenna 100 shown in FIG. 16, middle column #2 may only be partially populated with elements 101 both to control the azimuth beamwidth (wider with more signal(?)weight on left outside column #1) and also open up space for other applications on the same reflector, such as higher band arrays. As noted above, this is another way to adjust the azimuth beamwidth of antenna 100. By omitting elements 101 in center column #2, there is a corresponding reduction in the number of rows that have elements 101 in the center, shared between arrays 102 and 103, resulting in the azimuth beamwidths of both arrays getting wider. Ideally for 4*4 MIMO antenna 100 application, omitting elements 101 in center column #2 is preferably done as a pair (even number of rows) so both right and left side arrays 102 and 103 have same number of elements 101.

For example, in FIG. 16, with an eight (8) row configuration, four (4) elements 101 are omitted from the top and bottom of col #2, in which two of them each belonged (as per full arrangement in FIG. 13) to left and right arrays 102 and 103. Having even numbers when omitting elements 101 helps to keep the azimuth beamwidth the same value for all MIMO beams from antenna 100. However, if in some application different beamwidth is required for left and right arrays 102 and 103, a single element 101 can be omitted from middle column #2, from either left array 102 or right array 103 as desired.

Figure 17:
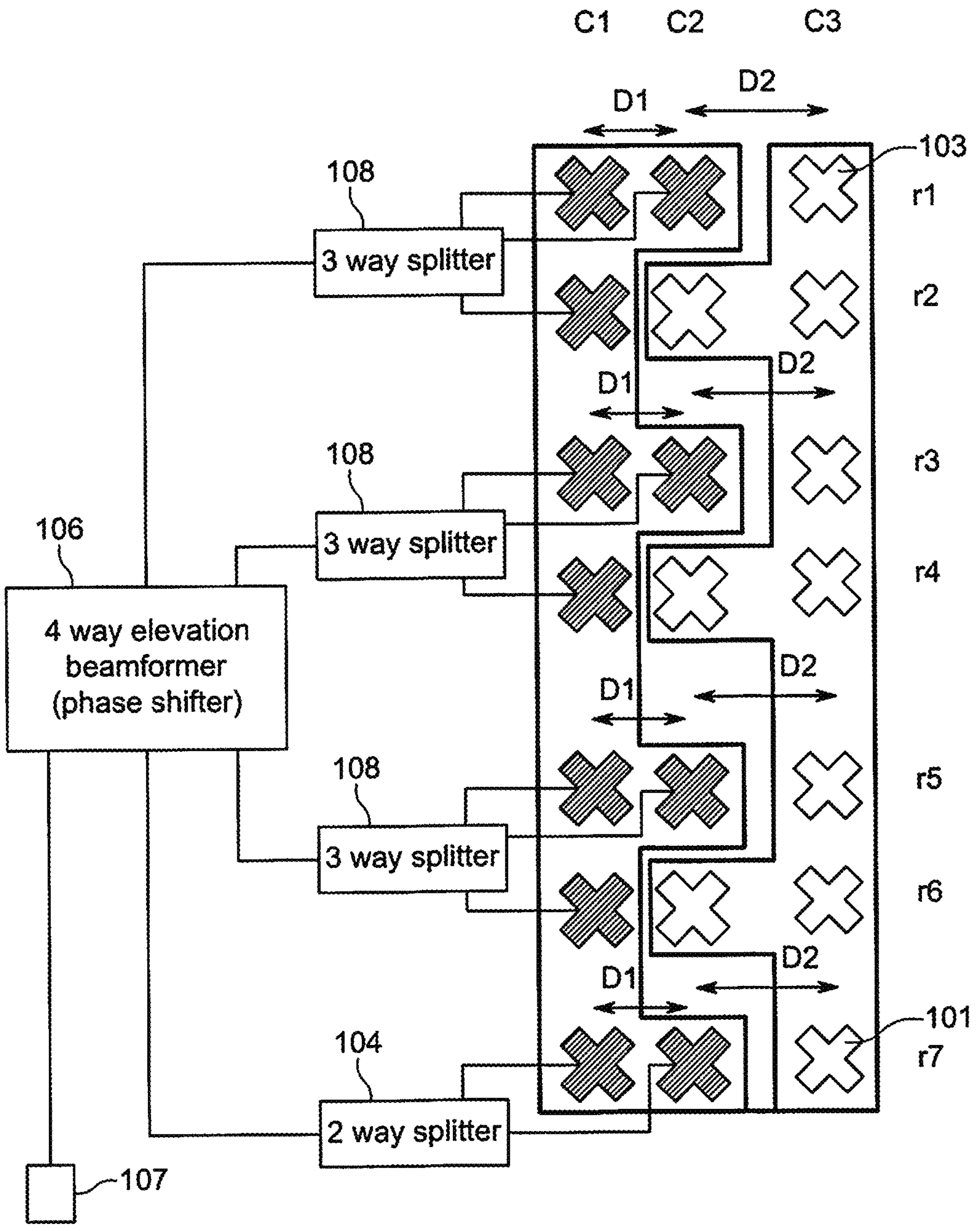
FIG. 17 shows an alternate arrangement of the three column 4×4 MIMO antenna from FIG. 13 with an odd number of rows of elements and shifted center column, in accordance with one embodiment.

In another embodiment, a spacing D1 between column #1 and column #2 can be different from spacing D2 between column #2 and column #3. For an architecture of antenna 100 with an odd number of rows (e.g. rows #1-7 instead of #1-#8) left array 102 for example has more elements 101 than right array 103. For example, in FIG. 17, left array 102 has eleven (11) elements 101 (arranged 2,1,2, 1,2, 1,2 in rows #1-#7 respectively) while right array 103 has ten (10) elements 101 (arranged 1,2,1,2,1,2,1 in rows #1-#7 respectively). With an even distance between each of columns #1-#2 and #2-#3, this would result in a narrower azimuth beamwidth for left array 102 compared to right array 103. By making column spacing unequal with D1 between column #1 and #2 being less than D2 between column #2 and #3 as shown in FIG. 17 the beamwidth of right array 103 decreases while the beamwidth of left array 102 increases which can compensate for the above-described effects of the extra element 101 in left array 102.

Figure 18:
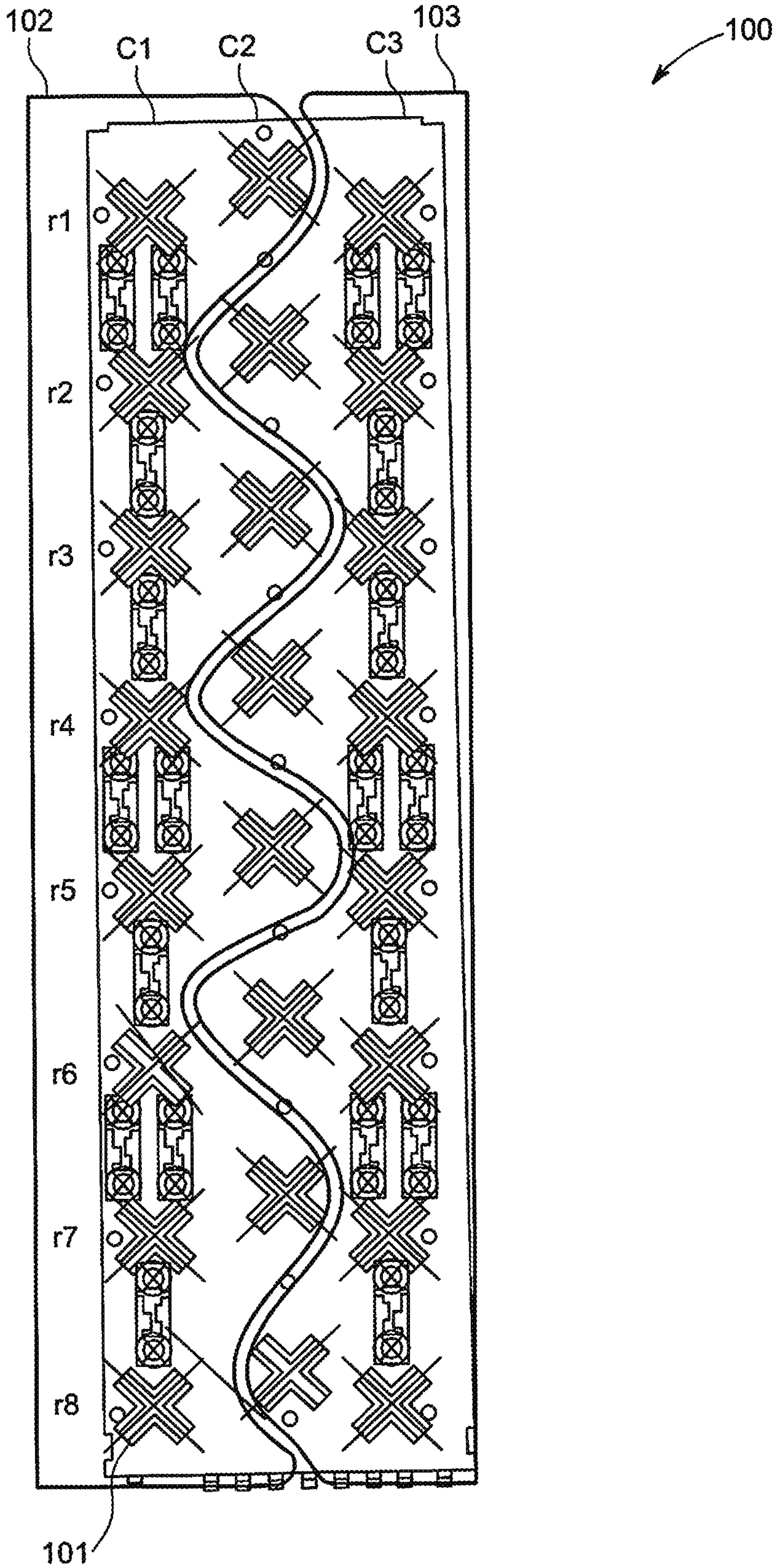
FIG. 18 shows a specific implementation of a three column 4×4 MIMO antenna at 65 degrees with vertically shifted center column, in accordance with one embodiment.

Turning to a specific implementation of a 65 degree 4×4 MIMO antenna 100 using the basic architecture of FIG. 13, a wideband 65 degree 4×4 MIMO antenna 100 in a low frequency range (e.g. 617-896 MHz) is shown in FIG. 18. It is noted that other smaller elements shown in FIG. 18 are only for context that other arrays in other frequency ranges may be present on the same reflector.

Normally, a single column of cross dipole antenna elements would have an azimuth beamwidth more than 65 deg and usually in the range of 75 deg to 90 deg. In prior art such as in FIG. 11, to reduce the azimuth beamwidth of the array to a desired 65 deg, staggering of elements in the column is used (e.g. see left and right "columns" in FIG. 13). However, this prior art staggering approach has limitation in increasing gain values due to high spatial distance needed between elements, caused by staggering) which results in producing off-axis grating lobes.

In the present arrangement shown in FIG. 18 using the three (3) column arrangement for elements 101 with middle column #2 sharing elements 101 between left array 102 and right array 103, there is s no limitation in gain increase while decreasing the azimuth beamwidth.

It is noted that spacing between vertical columns #1-#2 and #2-#3 of elements 101 depends on the required frequency band and available beam width of antenna 100 and can vary typically from about 160 mm to 200 mm for low-band (614-960 MHz). In the arrangement shown in FIG. 18 for 65 degree 4×4 MIMO the column spacing between vertical columns #1-#2 and between #2-#3 is (equally) set to 165 mm. Because of the closeness of elements 101 in column #1 and #2 (left array 102) and elements 101 in column #2 and #3 (right array 103), elements in middle column #2 may be vertically shifted with respect to left and right columns to reduce cross polar and co-polar coupling between elements if needed. For example, in the arrangement of antenna 100 shown in FIG. 18, a vertical shift of 50 mm is used for elements 101 in column #2.

As discussed above, elements 101 of middle column #2 are shared between left 102 and right 103 array in a way that in first row #1 element 101 of middle column #2 is used in left array 102 and in second row #2 element 101 of middle column #2 is used in right array 103 and so on, alternating down through row #8. Addition of these extra elements 101 from center column #2 to the remaining elements 101 in either of left array 102 (column #1) or right array 103 (column #3) reduces the azimuth beamwidth of both arrays 102/103 without introducing grating lobes while keep the physical width of antenna 100 the same as prior art (e.g. FIG. 11). This improves the gain of antenna 100 (at 65 degrees) about 0.7 dB relative to a standard 65 deg such as that shown in prior art FIG. 11.

Figure 19:
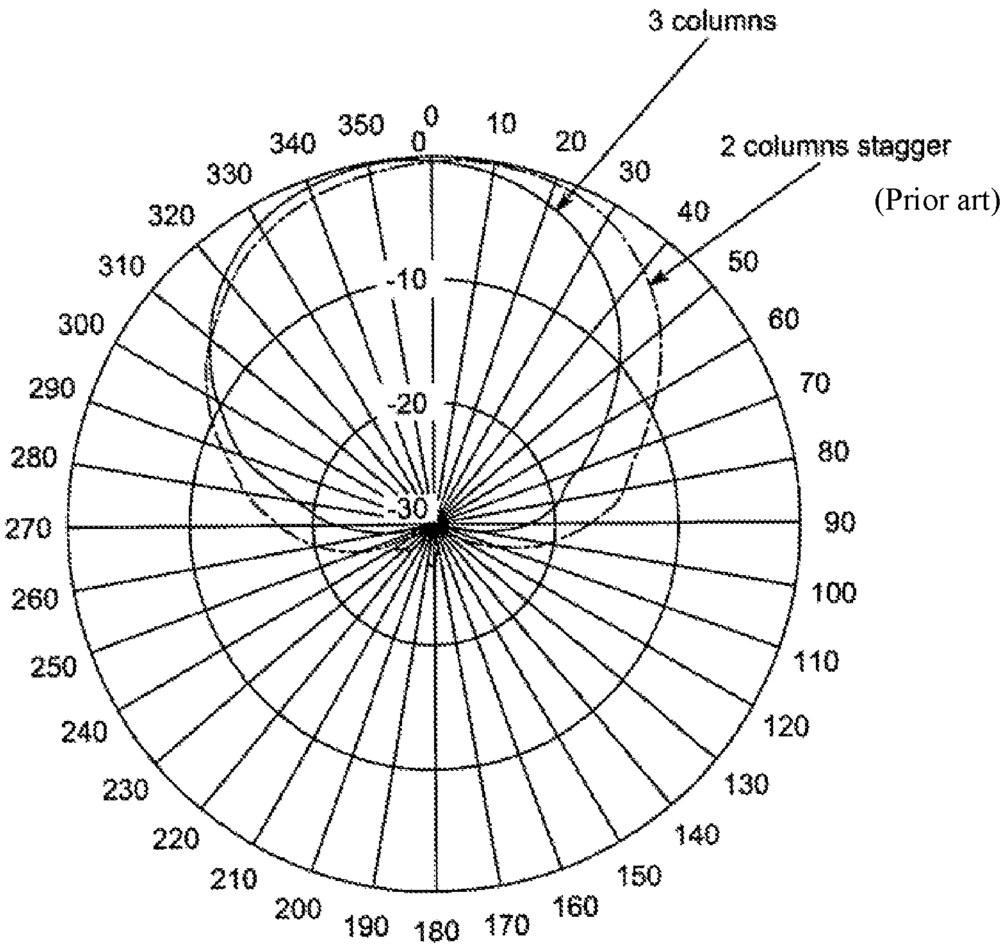
FIG. 19 shows an azimuth pattern of the antenna of FIG. 18 (65 degrees) compared to an azimuth pattern of the prior art antenna of FIG. 11, in accordance with one embodiment.

FIG. 19 shows a comparison of a 65 deg azimuth pattern of antenna 100 from FIG. 18 compared to the prior art arrangement of FIG. 11, showing an improved azimuth bandwidth of 63 degrees (narrower) than the wider 74 degrees (wider) from the prior art, even though it fits within the same overall 500 mm width for antenna 100. For example, at this frequency shown in FIG. 19 (low band), a gain increase from 13.6 dB to 14.3 dB (0.7 dB increase) is obtained, with the normalized pattern showing the narrowed azimuth beamwidth (corresponding to the gain increase).

Figure 20:
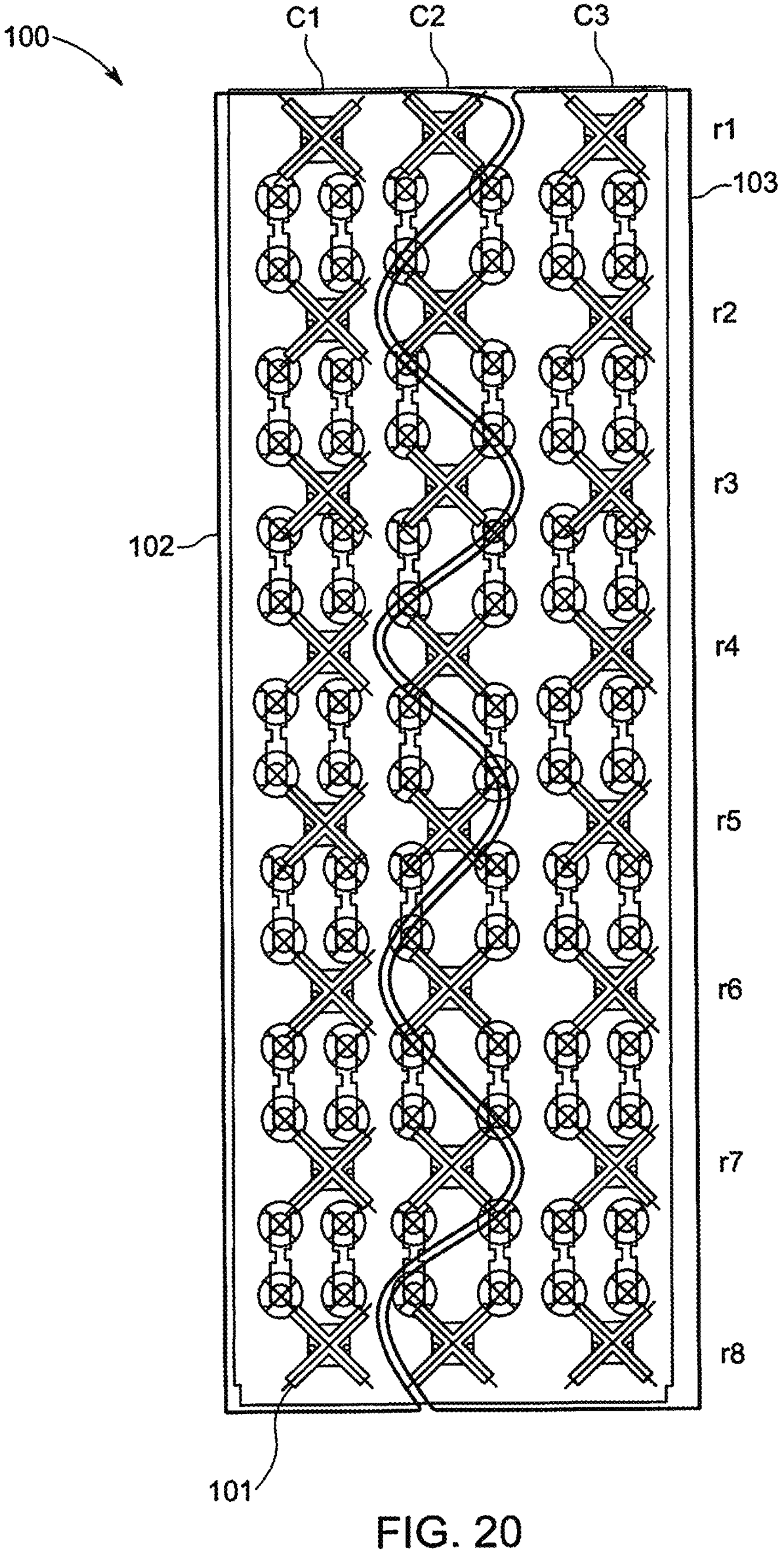
FIG. 20 shows a specific implementation of a three column 4×4 MIMO antenna at 45 degrees with wider spacing between columns, in accordance with one embodiment.

In another embodiment, an exemplary 45 deg 4×4 MIMO antenna 100 is shown in FIG. 20. In FIG. 20 elements 101 and left and right arrays 102 and 103 form a low frequency range (e.g. 698-960 MHz) 4*4 MIMO at 45 degrees. It is noted that antenna 100 also has mid band elements 200 which can be used for a frequency range (e.g. 1695-2690 MHz) 8*8 MIMO (e.g. a 12 port antenna) Here it is understood that the six (6) columns of midband elements 200 and the arrays formed therefrom for generating the separate midband 8*8 MIMO may use similar approaches to the present arrangement (shared elements in center column (s) but for illustrating the salient points, only the low band elements 101 and left and right arrays 102 and 103 are discussed in detail.)

As with the 65 deg embodiment, in FIG. 18, in this low band 45 degree arrangement shown in FIG. 20, middle vertical column #2 of elements 10 shares elements with both left (col #1) and right (col. #3) arrays 102 and 103. In this arrangement the middle vertical column #2 of elements 101 is not shifted up, as there is likely no coupling issues, but the spacing between vertical column #1 and #2 as well as between vertical column #2 and #3 is about 215 mm so that the azimuth beam width of antenna 100 is 45 degrees. In prior art such as in FIG. 12, to produce a 45 deg beam, two (2) columns are used for each array. Thus for a prior art 4*4 MIMO 45 degree arrangement the combined left and right arrays have a total of four (4) columns array which increases the overall physical width of the antenna by two times (e.g. compared to a two port (2*2 MIMO) 45 deg array—e.g. left side of FIG. 12). Using the present architecture in FIG. 20 the total width of antenna 100 only increases by about 1.54 times of single two ports array, despite having two full arrays handling four ports. Nevertheless, the gain performance azimuth beamwidth is about the same.

Figure 21:
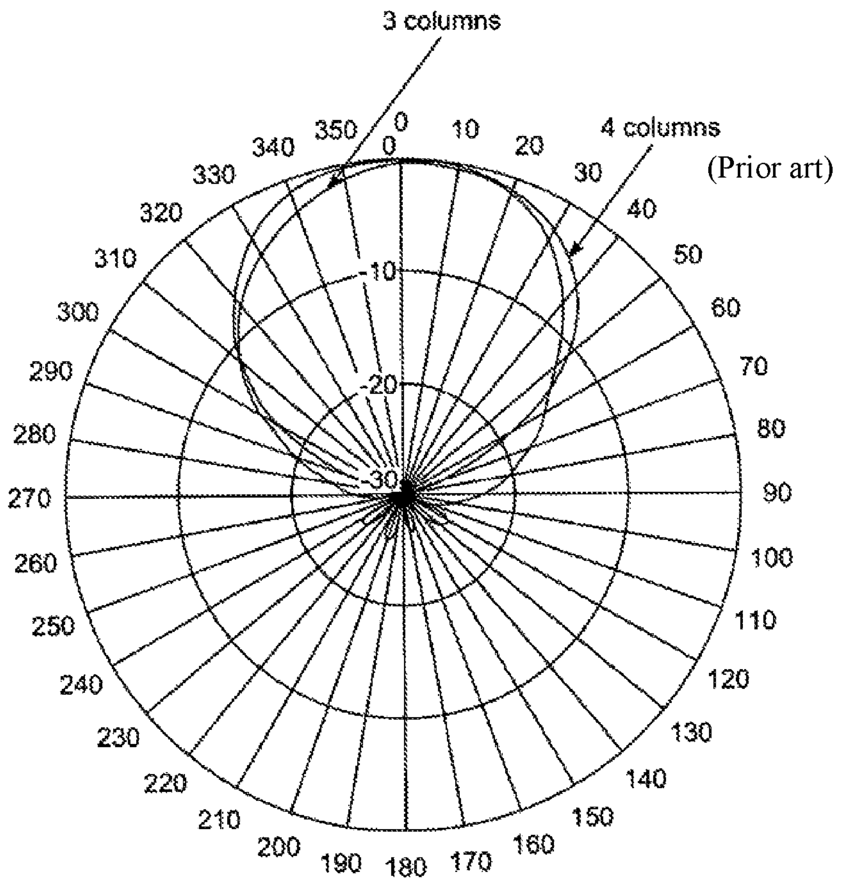
FIG. 21 shows an azimuth pattern of the antenna of FIG. 20 (45 degrees) compared to an azimuth pattern of the prior art antenna of FIG. 12, in accordance with one embodiment.

For example, FIG. 21 shows an azimuth pattern of the antenna of FIG. 20 (45 degrees) compared to an azimuth pattern of the prior art antenna of FIG. 12, in accordance with one embodiment.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A cellular antenna comprising:

at least a first array of elements arranged in horizontal rows and vertical columns; and at least a second array of elements arranged in horizontal rows and vertical columns, wherein said first array and said second array are arranged at least partially side-by side on said antenna, wherein said elements of said first array are arranged in at least one vertical column of elements that is exclusive to elements of said first array, wherein said elements of said second array are arranged in at least one vertical column of elements that is exclusive to elements of said second array, and wherein said antenna includes at least one separate middle vertical column of elements, between the at least one vertical column of elements that is exclusive to elements of said first array and the at least one vertical column of elements that is exclusive to elements of said second array, wherein said middle vertical column of elements includes some elements in said first array and some elements in said second array, wherein said antenna has three vertical columns of elements, and wherein said first array is a left side array and the at least one vertical column of elements that is exclusive to elements of said first array is a left vertical column, wherein said second array is a right side array and the at least one vertical column of elements that is exclusive to elements of said second array is a right vertical column, with said middle vertical column of elements therebetween wherein said left side array and said right side array together form a 4×4 MIMO antenna, wherein said 4×4 MIMO antenna has either an approximate 45 degree or 65 degree azimuth beamwidth; and wherein distances between said left, right, and middle vertical columns of elements, combined with setting azimuth and vertical splitting power between the antenna elements of said left, right, and middle vertical columns of elements, is sufficient to provide said either approximate 45 degree or 65 degree azimuth beamwidth with increased gain relative to prior art 45 degree or 65 degree antennas, but without said antenna exceeding 500 mm in width.

2. The antenna as claimed in claim 1, wherein said antenna has at least two horizontal rows of elements across said left vertical column, said middle column, and said right column, wherein in each alternating row of elements down a vertical length of said antenna, an element in said middle vertical column belongs to said left array and an element in a next subsequent vertical row belongs to said right array.

3. The antenna as claimed in claim 2, wherein in any horizontal row of elements, when either said left array or said right array has two elements, power between said elements is split evenly.

4. The antenna as claimed in claim 2, wherein in any horizontal row of elements, when either said left array or said right array has two elements, power between said elements is split unevenly.

5. The antenna as claimed in claim 4, in any horizontal row of elements, when either said left array or said right array has two elements, power between said elements is split unevenly, such that more power is provided to an element in either the left vertical column of the left array or the right vertical column in the right array in order to widen an azimuth width of a beam from said antenna.

6. The antenna as claimed in claim 4, in any horizontal row of elements, when either said left array or said right array has two element, power between said elements is split unevenly, such that more power is provided to an element in said middle vertical column of either the left array or the right array in order to narrow an azimuth width of a beam from said antenna.

7. The antenna as claimed in claim 2, wherein a horizontal distance between said left column of elements and said middle vertical column of elements is smaller than a horizontal distance between said middle column of elements and said right vertical column of elements when there is an uneven number of horizontal rows of elements and said left array has more elements than said right array.

8. The antenna as claimed in claim 2, wherein a horizontal distance between said right column of elements and said middle vertical column of elements is smaller than a horizontal distance between said middle column of elements and left vertical column of elements when there is an uneven number of horizontal rows of elements and said right array has more elements than said left array.

9. The antenna as claimed in claim 1, wherein a horizontal distance between said left side vertical column of elements and said middle vertical column of elements and a horizontal distance between said middle vertical column of elements and said right vertical column of elements is about 215 mm.

10. The antenna as claimed in claim 1, wherein a horizontal distance between said left side vertical column of elements and said middle vertical column of elements and a horizontal distance between said middle vertical column of elements and said right vertical column of elements is about 165 mm.

11. The antenna as claimed in claim 1, wherein elements in said middle vertical column of elements are offset approximately 50 mm in the vertical direction relative to elements in said left and right vertical column of elements in each horizontal row to prevent cross polar and co-polar coupling between adjacent elements.

* * * * *